(12) United States Patent
Beit-Aharon

(10) Patent No.: US 11,106,440 B2
(45) Date of Patent: *Aug. 31, 2021

(54) SOURCE CODE TRANSLATION

(71) Applicant: Ab Initio Technology LLC, Lexington, MA (US)

(72) Inventor: Jonathan Beit-Aharon, Newton, MA (US)

(73) Assignee: Ab Initio Technology LLC, Lexington, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/410,158

(22) Filed: May 13, 2019

(65) Prior Publication Data

US 2020/0073645 A1 Mar. 5, 2020

Related U.S. Application Data

(63) Continuation of application No. 15/894,096, filed on Feb. 12, 2018, now Pat. No. 10,289,396, which is a
(Continued)

(51) Int. Cl.
*G06F 8/51* (2018.01)
*G06F 8/76* (2018.01)

(52) U.S. Cl.
CPC . *G06F 8/51* (2013.01); *G06F 8/76* (2013.01)

(58) Field of Classification Search
CPC ..................................... G06F 8/51; G06F 8/76
(Continued)

(56) References Cited

U.S. PATENT DOCUMENTS 4,586,137 A 4/1986 Frost, Jr. et al.
5,088,034 A 2/1992 Ihara et al.
(Continued)

FOREIGN PATENT DOCUMENTS

CA 2259362 1/1998
CN 1786950 6/2006
(Continued)

OTHER PUBLICATIONS

"Relational algebra", http/en.wikipedia.org/wiki/Relational_algebra, Feb. 5, 2010.
(Continued)

*Primary Examiner* — Chat C Do
*Assistant Examiner* — Bradford F Wheaton
(74) *Attorney, Agent, or Firm* — Occhiuti & Rohlicek LLP

(57) ABSTRACT

Software specification translation includes: receiving a first software specification specified in a first programming language, a second software specification specified in a second programming language, a third software specification specified in a third programming language different from the first and second programming languages, the third software specification defining one or more data relationships between the first software specification and the second software specification. A combined representation of the first software specification and the second software specification is formed in a fourth programming language different from the first, second, and third programming languages. Connections are formed in the fourth programming language between a representation of the first software specification and the representation of the second software specification according to identified data relationships.

35 Claims, 13 Drawing Sheets

Related U.S. Application Data continuation of application No. 14/563,066, filed on Dec. 8, 2014, now Pat. No. 9,891,901.

(60) Provisional application No. 61/912,594, filed on Dec. 6, 2013.

(58) Field of Classification Search
USPC .......................................................... 717/137
See application file for complete search history.

(56) References Cited

U.S. PATENT DOCUMENTS

| | | | |
|---|---|---|---|
| 5,136,705 A * | 8/1992 | Stubbs | G01R 31/318307 714/27 |
| 5,151,991 A | 9/1992 | Iwasawa et al. | |
| 5,257,366 A * | 10/1993 | Adair | G06F 16/25 |
| 5,313,584 A | 5/1994 | Tickner et al. | |
| 5,347,639 A | 9/1994 | Rechtschaffen et al. | |
| 5,367,619 A | 11/1994 | DiPaolo et al. | |
| 5,446,915 A | 8/1995 | Pierce | |
| 5,475,842 A | 12/1995 | Gilbert et al. | |
| 5,475,843 A | 12/1995 | Halviatti et al. | |
| 5,546,576 A | 8/1996 | Cochrane et al. | |
| 5,574,898 A | 11/1996 | Leblang et al. | |
| 5,588,150 A | 12/1996 | Lin et al. | |
| 5,600,833 A | 2/1997 | Senn et al. | |
| 5,619,692 A | 4/1997 | Malkemus et al. | |
| 5,632,022 A | 5/1997 | Warren et al. | |
| 5,678,044 A | 10/1997 | Pastilha et al. | |
| 5,682,537 A | 10/1997 | Davies et al. | |
| 5,706,509 A | 1/1998 | Man-Hak Tso | |
| 5,712,971 A | 1/1998 | Stanfill et al. | |
| 5,734,886 A | 3/1998 | Grosse et al. | |
| 5,752,196 A | 5/1998 | Ahvenainen et al. | |
| 5,768,564 A | 6/1998 | Andrews et al. | |
| 5,799,149 A | 8/1998 | Brenner et al. | |
| 5,819,021 A | 10/1998 | Stanfill et al. | |
| 5,870,743 A | 2/1999 | Cohen et al. | |
| 5,901,353 A | 5/1999 | Pentikainen | |
| 5,909,681 A | 6/1999 | Passera et al. | |
| 5,930,723 A | 7/1999 | Heiskari et al. | |
| 5,935,216 A | 8/1999 | Benner et al. | |
| 5,956,074 A | 9/1999 | Sclafani | |
| 5,966,072 A | 10/1999 | Stanfill et al. | |
| 5,978,044 A | 11/1999 | Choi | |
| 5,999,729 A | 12/1999 | Tabloski, Jr. et al. | |
| 6,031,993 A | 2/2000 | Andrews et al. | |
| 6,077,313 A | 6/2000 | Ruf | |
| 6,205,465 B1 | 3/2001 | Schoening et al. | |
| 6,253,371 B1 | 6/2001 | Iwasawa et al. | |
| 6,266,804 B1 | 7/2001 | Isman | |
| 6,295,518 B1 | 9/2001 | McLain et al. | |
| 6,311,265 B1 | 10/2001 | Beckerle et al. | |
| 6,330,008 B1 | 12/2001 | Razdow et al. | |
| 6,345,267 B1 | 2/2002 | Lohman et al. | |
| 6,378,126 B2 | 4/2002 | Tang | |
| 6,415,286 B1 | 7/2002 | Passera et al. | |
| 6,453,464 B1 | 9/2002 | Sullivan | |
| 6,615,203 B1 | 9/2003 | Lin et al. | |
| 6,625,593 B1 | 9/2003 | Leung et al. | |
| 6,694,306 B1 | 2/2004 | Nishizawa et al. | |
| 6,725,212 B2 | 4/2004 | Couch et al. | |
| 6,785,668 B1 | 8/2004 | Polo et al. | |
| 6,836,883 B1 | 12/2004 | Abrams et al. | |
| 6,877,000 B2 | 4/2005 | Gajda et al. | |
| 6,915,290 B2 | 7/2005 | Bestgen | |
| D521,030 S | 5/2006 | Duffy et al. | |
| 7,047,232 B1 | 5/2006 | Serrano | |
| 7,080,062 B1 | 7/2006 | Leung et al. | |
| 7,111,019 B1 | 9/2006 | Nishizawa et al. | |
| 7,133,861 B2 | 11/2006 | Day et al. | |
| 7,164,422 B1 | 1/2007 | Wholey, III et al. | |
| 7,167,850 B2 | 1/2007 | Stanfill | |
| 7,225,444 B1 * | 5/2007 | Yung | G06F 16/24532 718/106 |
| 7,249,120 B2 | 7/2007 | Bruno et al. | |
| 7,359,922 B2 | 4/2008 | Young-Lai et al. | |
| 7,428,532 B2 | 9/2008 | Styles | |
| 7,441,238 B2 | 10/2008 | Zatloukal | |
| 7,464,084 B2 | 12/2008 | Huang et al. | |
| 7,584,205 B2 | 9/2009 | Stanfill et al. | |
| 7,664,730 B2 | 2/2010 | Ziauddin et al. | |
| 7,747,795 B2 | 6/2010 | Wong | |
| 7,843,941 B2 | 11/2010 | Kawamura | |
| 7,856,462 B2 | 12/2010 | Huang et al. | |
| 7,856,523 B2 | 12/2010 | Bittner, Jr. | |
| 7,870,556 B2 | 1/2011 | Wholey, III et al. | |
| 7,877,350 B2 | 1/2011 | Stanfill et al. | |
| 7,899,833 B2 | 3/2011 | Stevens et al. | |
| 7,917,463 B2 | 3/2011 | Dagum et al. | |
| 7,930,432 B2 | 4/2011 | Blaszczak | |
| 7,933,916 B2 | 4/2011 | Dolin et al. | |
| 7,945,562 B2 | 5/2011 | Ahmed et al. | |
| 7,953,891 B2 | 5/2011 | Blaszczak et al. | |
| 7,987,179 B2 | 7/2011 | Ma et al. | |
| 8,069,129 B2 | 11/2011 | Gould et al. | |
| 8,122,088 B2 | 2/2012 | Banatwala | |
| 8,326,821 B2 | 12/2012 | Andrade et al. | |
| 8,392,398 B2 | 3/2013 | Aggarwal et al. | |
| 8,412,746 B2 | 4/2013 | Fox et al. | |
| 8,485,081 B2 | 7/2013 | Kim et al. | |
| 8,527,976 B2 | 9/2013 | Kahlon et al. | |
| 8,537,160 B2 | 9/2013 | Hargrove et al. | |
| 8,538,985 B2 | 9/2013 | Betawadkar-Norwood et al. | |
| 8,555,265 B2 | 10/2013 | Chambers et al. | |
| 8,572,236 B2 | 10/2013 | Sherb et al. | |
| 8,620,903 B2 | 12/2013 | Tatemura et al. | |
| 8,782,081 B2 | 7/2014 | Guan et al. | |
| 8,805,818 B2 | 8/2014 | Zane et al. | |
| 8,850,574 B1 | 9/2014 | Ansel et al. | |
| 8,875,145 B2 * | 10/2014 | Atterbury | G06F 9/44521 718/102 |
| 8,954,482 B2 | 2/2015 | Stanfill et al. | |
| 9,064,047 B2 | 6/2015 | Agarwal et al. | |
| 9,135,301 B2 | 9/2015 | Petride et al. | |
| 9,182,957 B2 | 11/2015 | Craymer | |
| 9,251,225 B2 | 2/2016 | Stanfill | |
| 9,292,373 B2 * | 3/2016 | Ercegovac | G06F 16/438 |
| 9,317,551 B1 | 4/2016 | Zander | |
| 9,424,315 B2 | 8/2016 | Chamdani et al. | |
| 9,633,104 B2 | 4/2017 | Wu et al. | |
| 9,665,620 B2 | 5/2017 | Schechter et al. | |
| 9,760,583 B2 | 9/2017 | Ananthapadmanabh et al. | |
| 2004/0019883 A1 * | 1/2004 | Banerjee | G06F 8/4434 717/152 |
| 2005/0038788 A1 | 2/2005 | Dettinger et al. | |
| 2006/0265362 A1 | 11/2006 | Bradford | |
| 2007/0214179 A1 | 9/2007 | Hoang | |
| 2008/0052299 A1 | 2/2008 | Shinke et al. | |
| 2010/0005077 A1 | 1/2010 | Krishnamurthy et al. | |
| 2010/0057695 A1 | 3/2010 | Kirovski et al. | |
| 2010/0121868 A1 | 5/2010 | Biannic et al. | |
| 2010/0211953 A1 | 8/2010 | Wakeling et al. | |
| 2010/0295833 A1 | 11/2010 | Nishio et al. | |
| 2010/0306750 A1 | 12/2010 | Helovuo | |
| 2011/0066602 A1 * | 3/2011 | Studer | G06F 16/248 707/690 |
| 2011/0119657 A1 * | 5/2011 | Vorbach | G06F 8/423 717/140 |
| 2011/0276789 A1 * | 11/2011 | Chambers | G06F 9/3851 712/220 |
| 2012/0102472 A1 | 4/2012 | Wu et al. | |
| 2012/0254845 A1 * | 10/2012 | Yi | G06F 8/45 717/144 |
| 2014/0019949 A1 * | 1/2014 | Craymer | G06F 8/443 717/150 |
| 2014/0032617 A1 * | 1/2014 | Stanfill | G06F 16/25 707/809 |

FOREIGN PATENT DOCUMENTS

| | | |
|---|---|---|
| CN | 1790324 | 6/2006 |
| CN | 101645074 | 2/2010 |

(56) References Cited

FOREIGN PATENT DOCUMENTS

| CN | 101809626 | 8/2010 |
|---|---|---|
| EP | 0421408 | 4/1991 |
| EP | 2110761 | 10/2009 |
| EP | 2251785 | 11/2010 |
| EP | 3287896 | 2/2018 |
| FI | 944887 | 7/1997 |
| FI | 945495 | 9/1997 |
| FI | 951270 | 10/1997 |
| JP | 03126169 | 5/1991 |
| JP | 0816429 | 1/1996 |
| JP | 10232875 | 9/1998 |
| JP | 11514116 | 11/1999 |
| JP | 2000148699 | 5/2000 |
| JP | 2001273327 A | 10/2001 |
| JP | 2003505766 | 2/2003 |
| JP | 2003099441 | 4/2003 |
| JP | 2006236360 | 9/2006 |
| JP | 2009181577 | 8/2009 |
| WO | 19970023826 | 7/1997 |
| WO | 20070061430 | 5/2007 |
| WO | 2008100949 | 8/2008 |

OTHER PUBLICATIONS

Adamos, Panayiotis, et al., "Architectural Principles of the 'Streamonas' Data Stream Management System and Performance Evaluation based on the Linear Road Benchmark." 2008 International Conference on Computer Science and Software Engineering, Dec. 12, 2008, pp. 643-646.
Afrati et al., "Performance Considerations on a Random Graph Model for Parellel Processing", Informatique Theorique et Applications, vol. 27, No. 4, pp. 367-388, (1993).
Aho et al., "Universality of Data Retrieval Languages", ACM, pp. 110-120. 1979.
Apers et al., "PRISMA/DB: A Parallel, Main Memory Relational DBMS", IEEE, pp. 541-554 (1992).
Bodin, Francois et al., "A User Level Program Transformation Tool," ACM 1998, pp. 180-187.
Boral et al., "Prototyping Bubba: A Highly Parallel Database System", IEEE, vol. 2, No. 1 pp. 4-24, (Mar. 1990).
Braun, Peter, "Parallel Program Debugging Using Scalable Visualization",IEEE, pp. 699-708 (1995).
Chamberlin et al., "A History of Evaluation of System R", Communications of the ACM, vol. 24, No. 10, DD. 632-646, Oct. 1981.
Cimitile et al., "Incremental migration strategies: data flow analysis for wrapping," Reverse Engineering, 1998, Proceedings Fifth Working Conference, Honolulu, HI Oct. 12-14, 1998, pp. 59-68.
Cutler, Gary, "OpenCOBOL 1.1 [Feb. 6, 2009 Version] Programmer's Guide," OpenCOBOL, (259 pages) Sep. 17, 2010.
David DeWitt, Jim Gray, Parallel Database Systems: the Future of High Performance Database Systems (first volume), bit, Japan, Kyoritsu Shuppan Co., Ltd, Dec. 1, 1993, vol. 25 No. 12 (English Translation).
DeWitt et al., "Parallel Database Systems: The Future of High Performance Database Systems", Communications of the ACM, vol. 35, No. 6, nn. 85-98, Jun. 1992.
DeWitt et al., "The Gamma Database Machine Project", IEEE, vol. 2, No. 1, pp. 44-62, (Mar. 1990).
Faust, Gregory Gerard "Semiautomatic Translation of COBOL into HIBOL" Massachusetts Institute of Technology Department of Electrical Engineering and Computer Science, Jan. 21, 1981 (119 pages).
Forrester Research's Ellen Carney Names Compact Solutions Among "Hot Insurance Tech Companies—2009", Jun. 29, 2009.
Garcia-Molina et al., "Database Systems the Complete Book Second Edition—Chapter 16—The Query Compiler," Pearson Prentice Hall, XP055315926, Jun. 15, 2008.
Graefe et al., "Encapsulation of Parallelism and Architecture Independence in Extensible Database Query Execution", IEEE, vol. 19, No. 8, pp. 749-764 (Aug. 1993).
Graefe, "Encapsulation of Parallelism in the Volcano Query Processing System", ACM, pp. 102-111, 1990.
Graefe, Goetze "Volcano—An Extensible and Parellel Query Evaluation System", IEEE, vol. 6, No. 1, DD: 120-135 (Feb. 1994).
Josifovski, Vanja, et al., "Optimizing Queries in Distributed and Composable Mediators." Cooperative Information Systems, 1999. COOPIS '99 Proceedinngs, 1999 I FCIS International Conference in Ediburgh, UK Sep. 2-4, 1999. Sep. 2, 1999, pp. 291-302.
Levy et al., "Querying Heterogeneous Information Sources Using Source Descriptions", Proceedings of the 22nd VLDB Conference, Mumbai (Bombay), India, pp. 251-262, 1996.
Li et al., "Load Balancing Problems for Multiclass Jobs in Distributed/ Parellel Computer Systems", IEEE, vol. 47, No. 3, DD: 322-332, (Mar. 1998).
Maciej Pilecki, "Optimizing SQL Server Query Performance", XP055458550, retrieved from internet: technet.microsoft.com/en-us/library/2007.11sqiquery.aspx (Mar. 12, 2018) (8 pages).
Mackert et al., "R *Optimizer Validation and Performance Evaluation for Distributed Queries", Proceedings of the Twelfth International Conference on Very Large Data Bases, Kyoto, pp. 149-159, Aug. 1986.
Ozsu et al., "Principles of Distributed Database Systems—Chapter 9—Multidatabase Query Processing", Principles of Distributed Database Systems: Third Edition, Springer New York, NY XP055267246, Mar. 2, 2011.
Rim et al., "An Efficient Dynamic Load Balancing Using the Dimension Exchange Method for Balancing Quantized Loads on Hypercube Multiprocessors", IEEE, pp. 708-712 (1999).
Selinger et al., "Access Path Selection in a Relational Database Management System", ACM, pp. 23-34, 1979.
Seshadri, Sangeetha, et al., "Optimizing Multiple Queries in Distributed Data Stream Systems." Proceedings of the 22nd International Conference on Data Engineering Workshops (ICDEW '06), Apr. 3, 2006, 6 pages.
Stanfill, Craig, "Massively Parallel Information Retrieval for Wide Area Information Servers", IEEE, pp. 679-682 (1991).
Stanfill, Craig, "The Marriage of Parallel Computing and Information Retrieval", IEEE, (2003).
Step, Gerbrand "Data Flow Restructuring" Master Software Engineering, University of Amsterdam (32 pages), Aug. 11, 2005.
Tjan, Bosco S., et al., "A Data-Flow Graphical User Interface for Querying a Scientific Database," 12602 Proceedings 1993 Symposium on Visual Languages, Aug. 24-27, 1993, 6 pages.
Torrent Technical White Paper, "ORCHESTRATOR for the SAS System—Delivering Scalability and Performance to SAS Applications," pp. 1-30.
Li, F. et al., "Automatic Extraction of Coarse-Grained Data-Flow Threads from Imperative Programs", IEEE Micro, vol. 32, No. 4, 2012.
Cimitile, A. et al., "Incremental migration strategies: Data flow analysis for wrapping", Proceedings: Fifth Working Conference on Reverse Engineering, IEEE, 1998.

* cited by examiner

| Dataset Function | Dataset Organization | Access Mode | Open Mode |
|---|---|---|---|
| OUTPUT Dataset | SEQUENTIAL | SEQUENTIAL | EXTEND |
| | SEQUENTIAL | SEQUENTIAL | OUTPUT |
| | INDEXED | SEQUENTIAL | OUTPUT |
| | INDEXED | RANDOM | OUTPUT |
| | INDEXED | DYNAMIC | OUTPUT |
| | INDEXED | SEQUENTIAL | EXTEND |
| | INDEXED | RANDOM | EXTEND |
| | INDEXED | DYNAMIC | EXTEND |
| | RELATIVE | SEQUENTIAL | OUTPUT |
| | RELATIVE | RANDOM | OUTPUT |
| | RELATIVE | DYNAMIC | OUTPUT |
| | RELATIVE | SEQUENTIAL | EXTEND |
| | RELATIVE | RANDOM | EXTEND |
| | RELATIVE | DYNAMIC | EXTEND |
| INPUT Dataset | SEQUENTIAL | SEQUENTIAL | INPUT |
| | INDEXED | SEQUENTIAL | INPUT |
| | RELATIVE | SEQUENTIAL | INPUT |
| LOOKUP Dataset | INDEXED | RANDOM | INPUT |
| | INDEXED | DYNAMIC | INPUT |
| | RELATIVE | RANDOM | INPUT |
| | RELATIVE | DYNAMIC | INPUT |
| UPDATEABLE LOOKUP Dataset | INDEXED | RANDOM | INPUT/OUTPUT |
| | INDEXED | DYNAMIC | INPUT/OUTPUT |
| | RELATIVE | RANDOM | INPUT/OUTPUT |
| | RELATIVE | DYNAMIC | INPUT/OUTPUT |

SOURCE CODE TRANSLATION

CROSS-REFERENCE TO RELATED APPLICATIONS

This application is a continuation of U.S. application Ser. No. 15/894,096, filed on Feb. 12, 2018, now U.S. Pat. No. 10,289,396, which is a continuation of U.S. application Ser. No. 14/563,066, filed on Dec. 8, 2014, now U.S. Pat. No. 9,891,901, which claims priority to U.S. Application Ser. No. 61/912,594, filed on Dec. 6, 2013, each of which is incorporated herein by reference.

BACKGROUND

This description relates to source code translation, and in particular, to translation of source code specified in one or more original software programming languages to one or more other, different software programming languages.

In the field of software development, software engineers can choose to develop software in one or more of a number of different programming languages. At the time of this writing, some examples of modern programming languages conventionally used by developers are Java, C#, and C++. In general, each programming language has its advantages and disadvantages and it is the job of the software engineer to take these advantages and disadvantages into account when choosing an appropriate programming language for a given application.

Over the years, the state of the art in programming languages has advanced, causing certain early programming languages to become less used, no longer supported, and/or obsolete. Some examples of such early programming languages are Basic and Fortran. Still, source code written in those early programming languages, often referred to as "legacy" code, commonly remains in production for many years due to its adequate performance. However, when such legacy code ceases to adequately function and changes to the code become necessary, it can be difficult to find software engineers who have the necessary skills to update the legacy code.

For this reason, source-to-source compilers have been developed, which receive a first software specification specified in a first programming language as input and generate a second software specification specified in a second, different programming language as output. Such source-to-source compilers are used to translate legacy code into modern programming languages, which are more easily edited by software engineers skilled in the use of modern programming languages.

SUMMARY

In one aspect, in general, a method for software specification translation includes: receiving a first software specification specified in a first programming language; receiving a second software specification specified in a second programming language; receiving a third software specification specified in a third programming language different from the first and second programming languages, the third software specification defining one or more data relationships between the first software specification and the second software specification; forming a representation of the first software specification in a fourth programming language different from the first, second, and third programming languages; forming a representation of the second software specification in the fourth programming language, analyzing the third software specification to identify the one or more data relationships; and forming a combined representation of the first software specification and the second software specification in the fourth programming language including forming connections in the fourth programming language between the representation of the first software specification in the fourth programming language and the representation of the second software specification in the fourth programming language according to the identified one or more data relationships.

Aspects can include one or more of the following features.

The first programming language is a procedural programming language.

The fourth programming language enables parallelism between different portions of a software specification.

The fourth programming language enables a plurality of types of parallelism including: a first type of parallelism enabling multiple instances of a portion of a software specification to operate on different portions of an input data stream; and a second type of parallelism enabling different portions of a software specification to execute concurrently on different portions of the input data stream.

The second programming language is a procedural programming language.

The second programming language is the same as the first programming language.

The one or more data relationships between the first software specification and the second software specification include at least one data relationship that corresponds to the first software specification receiving data from a first dataset and the second software specification providing data to the first dataset.

The fourth programming language is a dataflow graph-based programming language.

The connections in the fourth programming language correspond to directed links representing flows of data.

The first software specification is configured to interact with one or more datasets, each dataset having an associated dataset type of a plurality of dataset types in the first software specification, and the second software specification is configured to interact with one or more datasets, each dataset having an associated type of the plurality of dataset types in the second software specification, the method further including: processing the first software specification, the processing including: identifying the one or more datasets of the first software specification, and for each of the identified one or more datasets, determining the associated type of the dataset in the first software specification; and forming a representation of the first software specification in the fourth programming language, including, for each of the identified one or more datasets, forming a specification of the dataset in the fourth programming language, the specification of the dataset in the fourth programming language having a type corresponding to the associated type of the dataset in the first programming language; wherein at least one of the specifications of the one or more datasets in the fourth programming language has: an input dataset type or an output dataset type; processing the second software specification, the processing including: identifying the one or more datasets of the second software specification and for each of the identified one or more datasets, determining the associated type of the dataset in the second software specification; and forming a representation of the second software specification in the fourth programming language, including, for each of the identified one or more datasets, forming a specification of the dataset in the fourth programming language, the specification of the dataset in the fourth programming language having a type corresponding to the associated type of the dataset in the first programming language; wherein at least one of the specification of the one or more datasets in the fourth programming language enables: an input function or an output function.

Forming the combined representation includes at least one of: forming one or more connections to replace connections between the specifications of the one or more datasets of the second software specification in the fourth programming language enabling input functions and the representation of the second software specification in the fourth programming language with connections between the representation of the first software specification in the fourth programming language and the representation of the second software specification in the fourth programming language; or forming one or more connections to replace connections between the specification of the one or more datasets of the first software specification in the fourth programming language enabling input functions and the representation of the first software specification in the fourth programming language with connections between the representation of the second software specification in the fourth programming language and the representation of the first software specification in the fourth programming language.

The method further includes: preserving the one or more datasets of the first software specification in the fourth programming language enabling output functions in the representation of the first software specification in the fourth programming language, or preserving the one or more datasets of the second software specification in the fourth programming language enabling output functions in the representation of the second software specification in the fourth programming language.

The first software specification includes one or more data transformation operations and analyzing the first software specification includes identifying at least some of the one or more data transformation operations and classifying the identified data transformation operations into a corresponding data transformation type of the fourth programming language, and forming the representation of the first software specification in the fourth programming language includes, for each of the identified data transformation operations, forming a specification of the data transformation operation in the fourth programming language, the specification of the data transformation operation in the fourth programming language enabling a data transform operation corresponding to the data transformation type of the identified data transformation operation in the first programming language.

At least one of the specifications of the one or more datasets in the fourth programming language has a read-only random access dataset type.

Determining the associated type of the dataset in the first software specification includes analyzing parameters of dataset definitions and commands that access the dataset.

The parameters include one or more of a file organization associated with the dataset, an access mode associated with the dataset, a mode used to open the dataset, and input-output operations.

The method further includes: storing the combined representation of the first software specification and the second software specification in a storage medium.

The first software specification defines one or more data processing operations that interact with one or more datasets, and the second software specification defines one or more data processing operations that interact with one or more datasets.

The third software specification defines one or more data relationships between the one or more datasets of the first software specification and the one or more datasets of the second software specification.

In another aspect, in general, software is stored in a non-transitory form on a computer-readable medium, for software specification translation. The software includes instructions for causing a computing system to: receive a first software specification specified in a first programming language; receive a second software specification specified in a second programming language; receive a third software specification specified in a third programming language different from the first and second programming languages, the third software specification defining one or more data relationships between the first software specification and the second software specification; form a representation of the first software specification in a fourth programming language different from the first, second, and third programming languages; form a representation of the second software specification in the fourth programming language; analyze the third software specification to identify the one or more data relationships; and form a combined representation of the first software specification and the second software specification in the fourth programming language including forming connections in the fourth programming language between the representation of the first software specification in the fourth programming language and the representation of the second software specification in the fourth programming language according to the identified one or more data relationships.

In another aspect, in general, a computing system for software specification translation includes: an input device or port configured to receive software specifications, the software specifications including: a first software specification specified in a first programming language; a second software specification specified in a second programming language; a third software specification specified in a third programming language different from the first and second programming languages, the third software specification defining one or more data relationships between the first software specification and the second software specification; and at least one processor configured to process the received software specifications, the processing including: forming a representation of the first software specification in a fourth programming language different from the first, second, and third programming languages; forming a representation of the second software specification in the fourth programming language; analyzing the third software specification to identify the one or more data relationships; and forming a combined representation of the first software specification and the second software specification in the fourth programming language including forming connections in the fourth programming language between the representation of the first software specification in the fourth programming language and the representation of the second software specification in the fourth programming language according to the identified one or more data relationships.

In another aspect, in general, a computing system for software specification translation includes: means for receiving software specifications, the software specifications including: a first software specification specified in a first programming language; a second software specification specified in a second programming language; a third software specification specified in a third programming language different from the first and second programming languages, the third software specification defining one or more data relationships between the first software specification and the second software specification; and means for processing the received software specifications, the processing including: forming a representation of the first software specification in a fourth programming language different from the first, second, and third programming languages; forming a representation of the second software specification in the fourth programming language; analyzing the third software specification to identify the one or more data relationships; and forming a combined representation of the first software specification and the second software specification in the fourth programming language including forming connections in the fourth programming language between the representation of the first software specification in the fourth programming language and the representation of the second software specification in the fourth programming language according to the identified one or more data relationships.

Aspects can include one or more of the following advantages.

A technical problem that is solved involves converting between a software specification containing source code in a procedural language and a software specification containing source code in a language that is not restricted to procedural programming constructs but operates using a different modality. For example, instead of execution being driven solely by control explicitly passing between different procedures, the language may operate in a modality that involves data flowing between different programming entities to drive execution, alone or in combination with explicit control flow. Conversion of source code between languages with such fundamental differences involves more than mere transliteration between different styles of languages. For systems with source code in multiple languages, another technical problem that is solved involves providing source code for a new system that incorporates features of those multiple languages into a different language.

Converting a program based on identifying certain data relationships between different program specifications enables formation of a combined specification that can be more efficiently executed in various contexts, such as in data processing systems. For example, by converting a program written in one or more procedural programming languages into a dataflow graph representation, component parallelism, data parallelism, and pipeline parallelism are enabled. For component parallelism, a dataflow graph includes multiple components interconnected by directed links representing flows of data (or "dataflows") between the components, and components in different parts of the dataflow graph are able to run simultaneously on separate flows of data. For data parallelism, a dataflow graph processes data divided into segments (or "partitions") and multiple instances of a component are able to operate on each segment simultaneously. For pipeline parallelism, components in a dataflow graph that are connected by a dataflow link are able to run simultaneously as the upstream component adds data onto that dataflow and the downstream component receives data from that dataflow.

Converting a program (or specifications of at least some portions of the program) written in a procedural programming language into a dataflow graph representation of the program may enable the execution of different components of the dataflow graph representation on different servers.

Intermediate datasets which may be required by a program written in a procedural programming language (due to its non-parallel nature) can be eliminated from the dataflow graph by converting to a dataflow graph representation of the program and replacing the intermediate datasets with flows of data. In some examples, the intermediate datasets are taken out of the path of data flowing through the dataflow graph and are preserved to ensure that any other programs using the datasets can still access the data included in the dataset. In some examples, eliminating intermediate datasets can reduce storage and I-O traffic requirements.

Converting a program written in one or more procedural programming languages into a dataflow graph representation enables visualization of data lineage through the program.

The dataflow programming language is agnostic to database type. Thus, converting a program written in a procedural programming language into a dataflow graph representation of the program may enable use of the program with types of databases that were not originally supported by the program as written in the procedural programming language. That is, approaches may abstract inputs and outputs in the code (e.g., JCL/COBOL code) into flows which can be connected to many different types of sources and sinks (e.g., queues, database tables, files, etc.).

Converting a program written in a procedural programming language into a dataflow graph representation of the program may enable the use of reusable user defined data types. This is advantageous when compared to some procedural programming languages such as COBOL which makes no clear distinction between data types (i.e., metadata) and storage allocation but instead combines the two in the Data Division. The approaches described herein extract metadata from COBOL source code and create reusable data types (e.g., DML data types) and type definition files. The reusable data types and type definition files can be used for storage allocation at the top of a procedural transform as well as for port and lookup file record definitions. In some examples, the extracted data types (e.g., data type metadata from COBOL) in conjunction with the extracted datasets (e.g., dataset metadata from JCL) can also be used to consolidate partial descriptions of data (i.e., partial metadata) from multiple programs that access the same dataset into a comprehensive description of the data.

Converting a program written in one or more procedural programming languages into a dataflow graph representation enables simplified editing of the program thorough a dataflow graph based graphical development environment.

Other features and advantages of the invention will become apparent from the following description, and from the claims.

DESCRIPTION OF DRAWINGS

FIG. 5 is a table of dataset functions and their associated combinations of dataset organization types, access modes, and open modes.

DESCRIPTION

Figure 1:
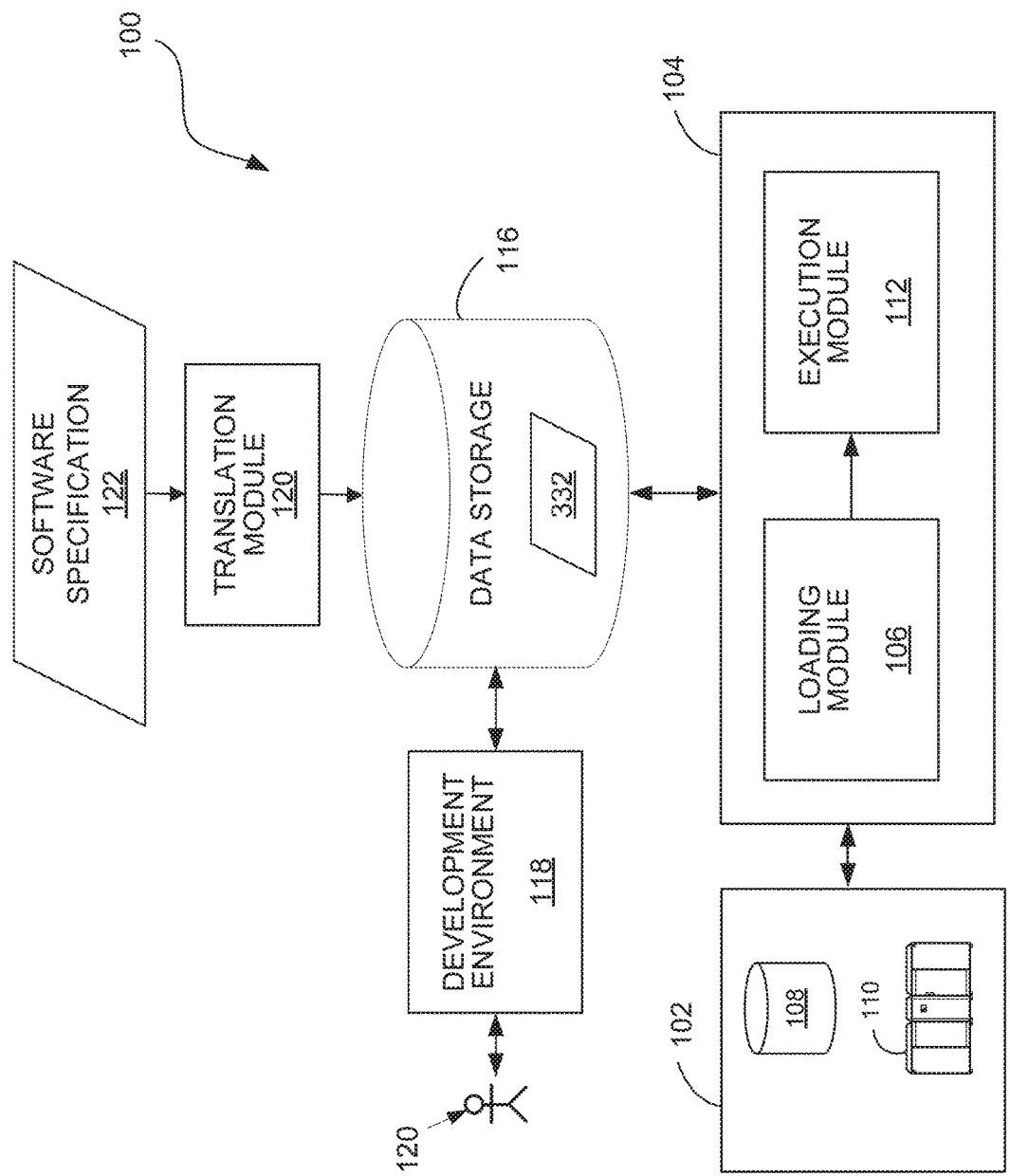
FIG. 1 is a block diagram of a system including a software translation module.

FIG. 1 shows an example of a data processing system 100 in which programs can be translated using the source code translation techniques described herein. The translated programs can be executed to process data from a data source 102 of the data processing system 100. A translation module 120 accepts a first software specification 122 in one or more procedural programming languages as input and processes the software specification 122 to generate a composite dataflow graph representation 332 of the first software specification 122 in a dataflow based programming language. The dataflow graph representation 332 of the first software specification 122 is stored in a data storage system 116, from which it can be presented visually within a development environment 118. A developer 120 can verify and/or modify the dataflow graph representation 332 of the first software specification 122 using the development environment 118.

The system 100 includes a data source 102 that may include one or more sources of data such as storage devices or connections to online data streams, each of which may store or provide data in any of a variety of formats (e.g., database tables, spreadsheet files, flat text files, or a native format used by a mainframe). An execution environment 104 includes a loading module 106 and an execution module 112. The execution environment 104 may be hosted, for example, on one or more general-purpose computers under the control of a suitable operating system, such as a version of the UNIX operating system. For example, the execution environment 104 can include a multiple-node parallel computing environment including a configuration of computer systems using multiple central processing units (CPUs) or processor cores, either local (e.g., multiprocessor systems such as symmetric multi-processing (SMP) computers), or locally distributed (e.g., multiple processors coupled as clusters or massively parallel processing (MPP) systems, or remote, or remotely distributed (e.g., multiple processors coupled via a local area network (LAN) and/or wide-area network (WAN)), or any combination thereof.

The loading module 106 loads the dataflow graph representation 332 into an execution module 112, from which it is executed for processing data from the data source 102. Storage devices providing the data source 102 may be local to the execution environment 104, for example, being stored on a storage medium connected to a computer hosting the execution environment 104 (e.g., hard disk drive 108), or may be remote to the execution environment 104, for example, being hosted on a remote system (e.g., mainframe 110) in communication with a computer hosting the execution environment 104, over a remote connection (e.g., provided by a cloud computing infrastructure). The dataflow graph representation 332 being executed by the execution module 104 can receive data from a variety of types of systems that may embody the data source 102, including different forms of database systems. The data may be organized as records (also called "rows") having values for respective fields (also called "attributes" or "columns"), including possibly null values. When first reading data from a data source, the dataflow graph representation 332 typically starts with some initial format information about records in that data source. In some circumstances, the record structure of the data source may not be known initially and may instead be determined after analysis of the data source or the data. The initial information about records can include, for example, the number of bits that represent a distinct value, the order of fields within a record, and the type of value (e.g., string, signed/unsigned integer) represented by the bits.

The dataflow graph representation 332 may be configured to generate output data, which may be stored back in the data source 102 or in the data storage system 116 accessible to the execution environment 104, or otherwise used. The data storage system 116 is also accessible to the development environment 118. The development environment 118 is, in some implementations, a system for developing applications as dataflow graphs that include vertices (representing data processing components or datasets) connected by directed links (also called "flows," representing flows of work elements, i.e., data) between the vertices. For example, such an environment is described in more detail in U.S. Publication No. 2007/0011668, titled "Managing Parameters for Graph-Based Applications," incorporated herein by reference. A system for executing such graph-based computations is described in U.S. Pat. No. 5,966,072, titled "EXECUTING COMPUTATIONS EXPRESSED AS GRAPHS," incorporated herein by reference. Dataflow graphs made in accordance with this system provide methods for getting information into and out of individual processes represented by graph components, for moving information between the processes, and for defining a running order for the processes. This system includes algorithms that choose interprocess communication methods from any available methods (for example, communication paths according to the links of the graph can use TCP/IP or UNIX domain sockets, or use shared memory to pass data between the processes).

1 Software Specification

In some examples, the first software specification 122 is specified using one or more procedural text based programming languages such as C, C++, Java, C#, IBM's Job Control Language (JCL), COBOL, Fortran, Assembly, and so on. For the some of the examples below, the software specification 122 includes a batch processing script written using the JCL scripting language and a number of programs written using the COBOL programming language. The JCL script references the COBOL programs and imposes a decision-based controlled flow of execution. It should be appreciated that the first software specification 122 is not limited to a combination of JCL and COBOL programming languages, and that this combination of programming languages is simply used to illustrate one exemplary embodiment of the translation module 120.

Figure 2:
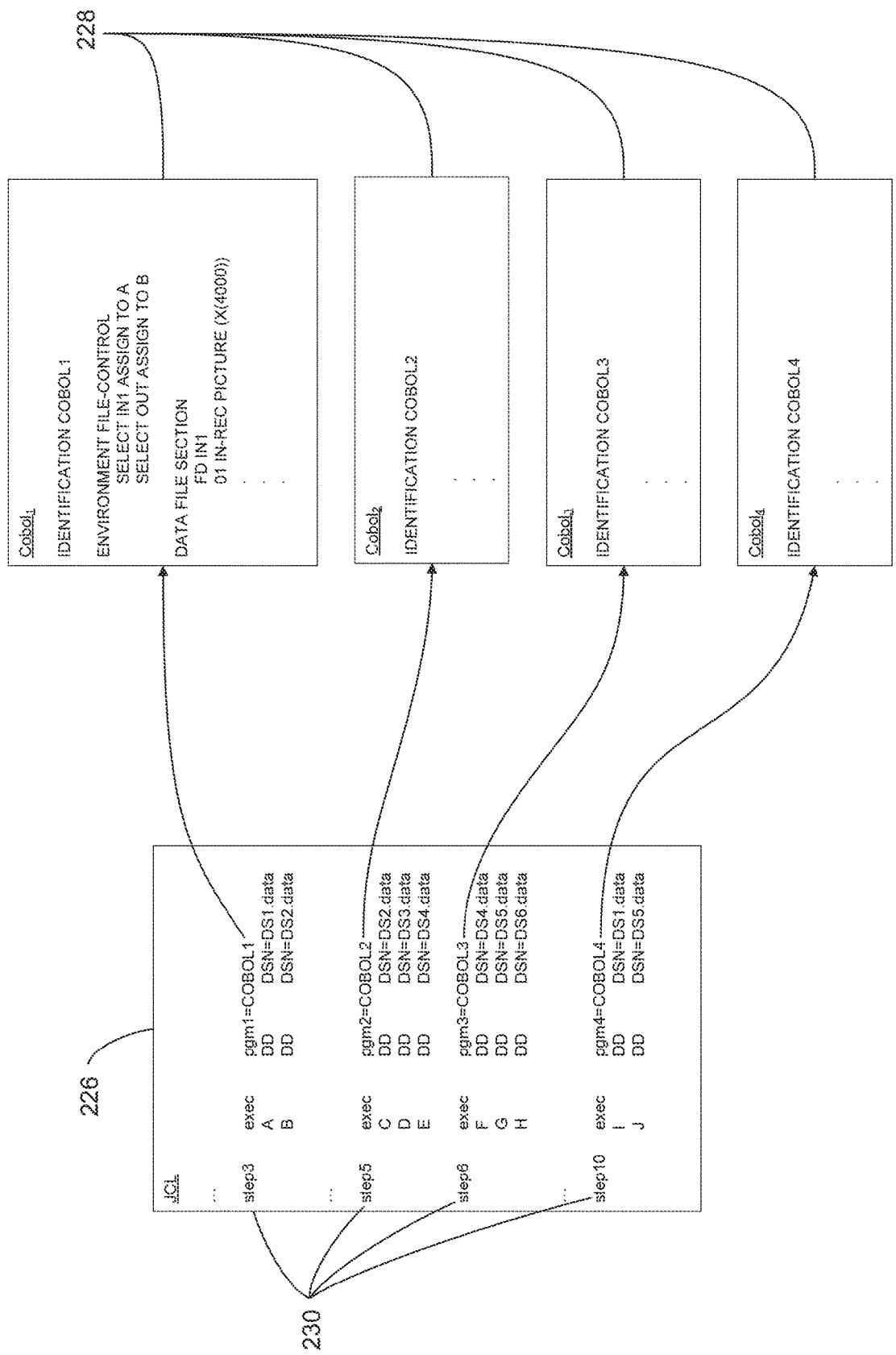
FIG. 2 is a schematic example of a software specification.

Referring to FIG. 2, a schematic view of one example of the software specification 122 of FIG. 1 includes a JCL script 226 including a number of steps 230, some of which execute COBOL programs 228. Other possible steps of the JCL script 226 are omitted to simplify this description. Each step in the JCL script that executes a COBOL program specifies the name of the COBOL program (e.g., COBOL1) and the datasets on which the COBOL program operates. For example, step 3 of the JCL script executes the COBOL program called "COBOL1" on the "DS1.data" and "DS2.data" datasets. In the JCL script 226, each dataset associated with a given COBOL program is assigned a file handle (also referred to as a "DD name"). For example, in FIG. 2, "DS1.data" is assigned the file handle "A" and "DS2.data" is assigned the file handle "B." Each of the COBOL programs 228 includes source code (written in the COBOL programming language) for operating on the datasets specified by the JCL script 226. The file handle (i.e., the DD name) for a given dataset is an identifier that is used by both the JCL script 226 and the code of the COBOL program to identify the dataset.

In operation, a conventional job scheduler running on, for example, an IBM mainframe computer accesses the JCL script 226 and sequentially (i.e., one at a time) executes the steps 230 of the script according to a control flow defined by the JCL script 226. In general, any COBOL programs that access input or output datasets do so by reading from or writing to a storage medium storing the datasets (e.g., a storage medium of the data source 102 or data storage system 116, such as a hard disk drive, referred to simply as "disk"). In general, each COBOL program executed by the JCL script 226 reads all of its input data from disk and writes all of its output data to disk before passing control back to the JCL script 226. Consequently, any steps that rely on the output of previous steps for input data generally must read the input data from disk.

2 Translation Module

Figure 3:
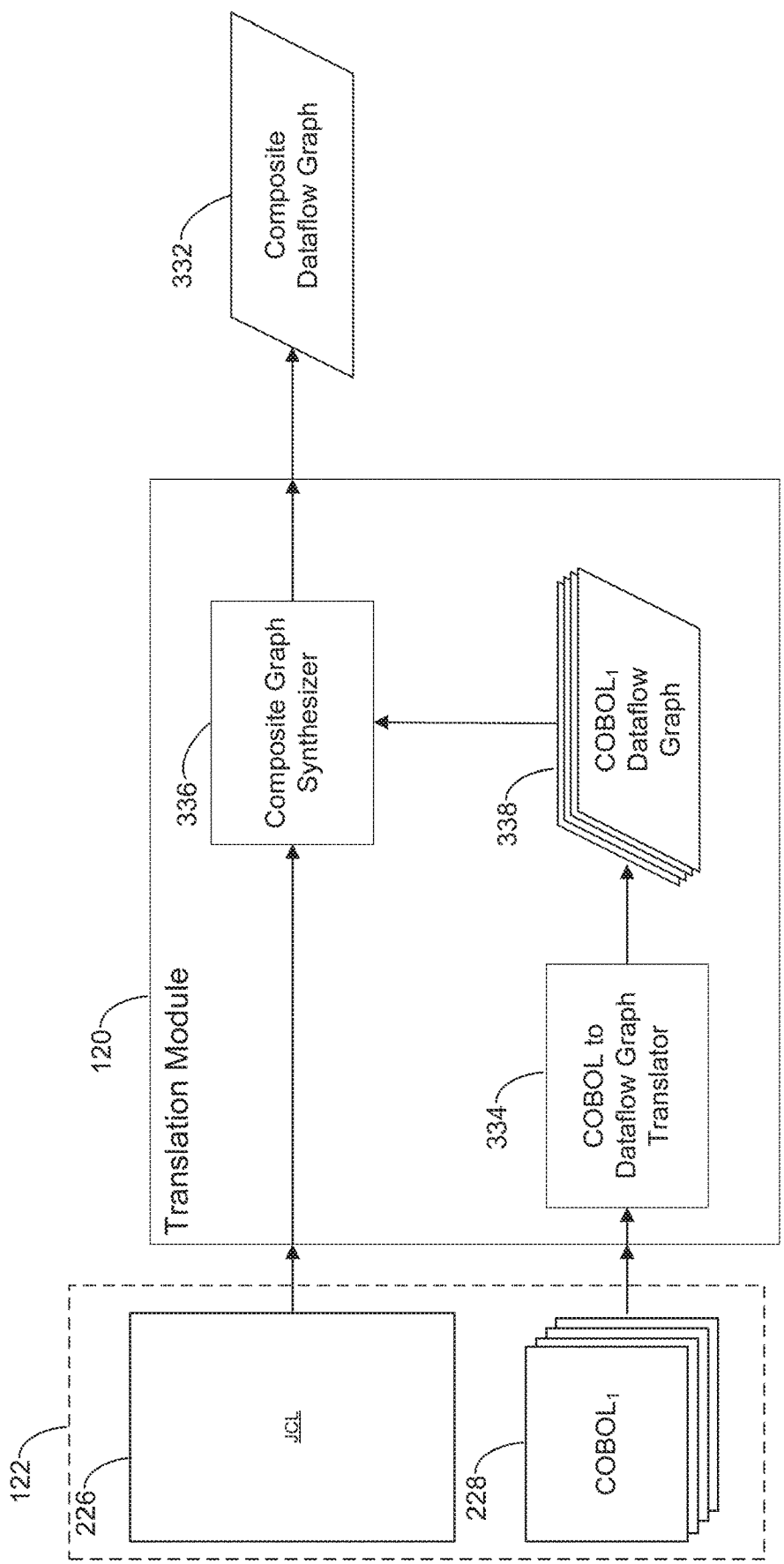
FIG. 3 is a block diagram of a top-level software translation module.

Referring to FIG. 3, one example of the translation module 120 of FIG. 1 receives the software specification 122 including the JCL script 226 and the COBOL programs 228 referenced by the JCL script 226 as input and processes the software specification 122 to generate a composite dataflow graph 332 that implements the same functionality as the first software specification 122 and is usable by the execution environment 104 of FIG. 1. The translation module 120 includes a COBOL to dataflow graph translator 334 and a composite graph synthesizer 336.

Very generally, the COBOL to dataflow graph translator 334 receives the COBOL programs 228 as input and converts each COBOL program into a separate dataflow graph representation 338 of the COBOL program. As is described in greater detail below, each dataflow graph representation 338 of a COBOL program includes a dataflow graph component referred to as a "procedural transform" component and zero or more datasets and/or other dataflow graph components. The procedural transform component includes ports such as input ports and output ports for connecting the procedural transform component to the datasets and other components of the dataflow graph representation 338 of the COBOL program and performs some or all of the functionality of the COBOL program. In some examples, the dataflow graph representation of the COBOL program includes dataflow graph components that are analogous to commands present in the COBOL program. In some examples, dataflow graph representations 338 of COBOL programs can be implemented as "sub-graphs" which have input ports and output ports for forming flows between the dataflow graph representation 338 instances of the COBOL programs and other dataflow graph components (e.g., other dataflow graph components of the composite dataflow graph 332 of FIG. 3).

The JCL script 226 and the dataflow graph representations 338 of the COBOL programs are provided to the composite graph synthesizer 336, which analyzes the JCL script 226 to determine dataflow interconnections between the COBOL programs and any other components. The composite graph synthesizer 336 then synthesizes the composite dataflow graph 332 by joining the input/output ports of the dataflow graph representations of the COBOL programs 338 using flows according to the determined dataflow interconnections. The composite graph synthesizer 336 determines the dataflow interconnections between the COBOL programs by identifying "intermediate" datasets that are written to by an earlier step of the JCL and read by a later step of the JCL. In some examples, the intermediate datasets can be eliminated and replaced by data flows between the components in the composite dataflow graph 332. Due to pipeline parallelism, significant performance improvements can be achieved by allowing data to flow directly between components without performing the intermediate steps of writing to and reading from disk. It is noted that the term "eliminated" as used above does not necessarily mean that the intermediate dataset is deleted. In some examples, the intermediate dataset is taken out of the path of data flowing through the dataflow graph but is still written to disk to ensure that other programs (e.g., those executed from other JCL scripts) depending on the intermediate dataset can still access its data. Where intermediate files can be entirely eliminated (because the JCL deletes them after their use), the dataflow graph representation will also lower storage capacity requirements.

In some examples, the sequential nature of certain steps in the JCL code can be ignored, yielding component parallelism in the composite dataflow graph 332. In other examples, for steps where the output of one step is provided as an input to another step, the sequential nature of the steps is preserved by connecting the respective components for the steps using a flow, resulting in pipeline parallelism.

2.1 COBOL to Dataflow Graph Translator

Figure 4:
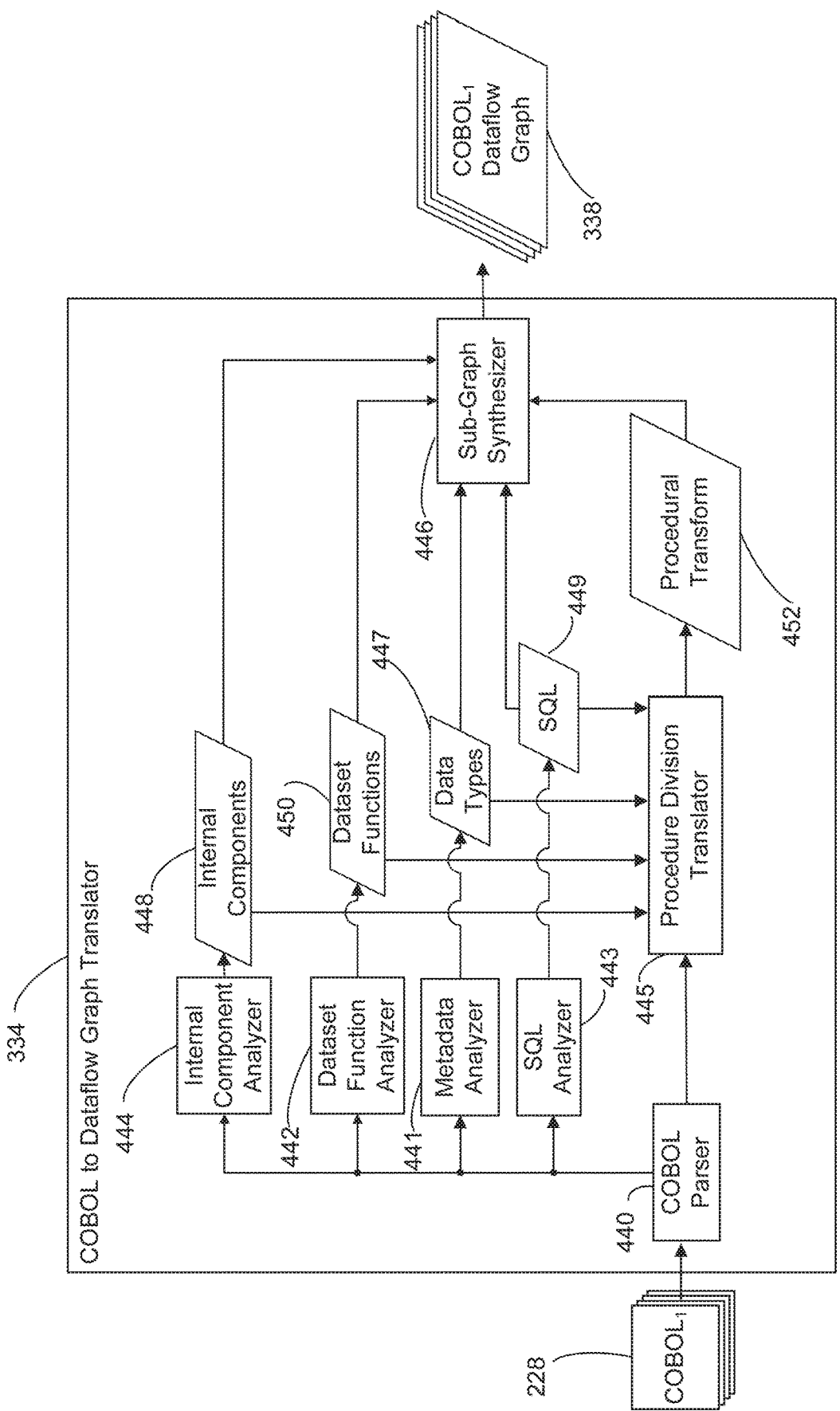
FIG. 4 is a block diagram of a software translation module.

Referring to FIG. 4, a detailed block diagram of an implementation of the COBOL to dataflow graph translator 334 receives a number of COBOL programs 228 as input and processes the COBOL programs 228 to generate a number of dataflow graph representations 338 of the COBOL programs. The COBOL to dataflow graph translator 334 includes a COBOL parser 440, an internal component analyzer 444, a dataset function analyzer 442, a metadata analyzer 441, a SQL analyzer 443, a procedure division translator 445, and a sub-graph synthesizer 446.

Each COBOL program 228 is first provided to the COBOL parser 440 which parses the COBOL program 228 to generate a parse tree. The parse tree generated by the COBOL parser 440 is then passed to the internal component analyzer 444, the dataset function analyzer 442, the metadata analyzer 441, and the SQL analyzer 443.

The internal component analyzer 444 analyzes the parse tree to identify program processes that have an analogous dataflow graph component in the dataflow graph programming language (e.g., internal sort). Some examples of COBOL operations that can be converted to dataflow graph components are "internal sort" and "internal recirculate" (temporary storage) operations. An internal sort operation corresponds to a component with an input port receiving a flow of unsorted data and an output port providing a flow of sorted data, with the input and output ports linked to a main component, as described in more detail below. An internal recirculate operation corresponds to an intermediate file that is first sequentially written in its entirety, and then read in its entirety within a COBOL program. The output of the dataset function analyzer 444 is an internal components result 448 including a listing of the identified operations along with their corresponding locations in the COBOL parse tree.

The above is applicable to any procedural languages where a statement or a sequence of statements and/or operations can be identified, where the statements and/or operations perform a particular transformation on a series of records in a flow that correspond to a component or sub-graph that receives the flow at an input port and provides transformed records from an output port.

The dataset function analyzer 442 analyzes the parse tree to identify all of the data sources and sinks (e.g., datasets) that are accessed (e.g., opened, created, written to, or read from) by the COBOL program 228 and determine a type associated with the dataset for the COBOL program. To do so, the dataset function analyzer 442 identifies and analyzes COBOL statements (e.g., OPEN, READ, WRITE, DELETE, etc.) that access the dataset. In some examples, the possible types that can be associated with a dataset include: INPUT, OUTPUT, LOOKUP, and UPDATABLE LOOKUP. COBOL definitions specify a handle to or the path of the dataset, a file organization of the dataset, and an access mode for the dataset, with additional information such as file open mode(s) determined from Input-Output statements.

Possible dataset file organizations include: SEQUENTIAL, INDEXED, and RELATIVE. A dataset with SEQUENTIAL organization includes records that can only be accessed sequentially (i.e., in the order that they were originally written to the dataset). A dataset with INDEXED organization includes records that are each associated with one or more indexed key(s). Records of an INDEXED dataset can be randomly accessed using a key, or sequentially form any given position in the file. A dataset with RELATIVE organization has record slots that are numbered with positive integers, with each slot either marked as empty or containing a record. When a file with RELATIVE organization is read sequentially, empty slots are skipped. The records of a RELATIVE file can be accessed directly using the slot number as a key. The notion of 'file position' is common to the three file organizations.

Possible access modes include: SEQUENTIAL, RANDOM, and DYNAMIC. SEQUENTIAL access mode indicates that records in the dataset are accessed sequentially in entry, ascending, or descending key order. RANDOM access mode indicates that records in the dataset are accessed using a record identifying key. DYNAMIC access mode indicates that records in the dataset can be accessed directly using a record identifying key, or sequentially from any selected file position.

Possible open modes include: INPUT, OUTPUT, EXTEND, and I-O. INPUT open mode indicates that the dataset is opened as an input dataset. OUTPUT open mode indicates that an empty dataset is opened as an output dataset. EXTEND open mode indicates that a dataset including preexisting records is opened as an output dataset to which new records are appended. I-O open mode indicates that the dataset open mode supports both input and an output dataset operations (regardless of whether such operations are present in the program).

The dataset function analyzer 442 applies the following set of rules to the file organization, access mode, and open mode of the COBOL dataset access command to determine the function associated with the dataset for the COBOL program:
  OUTPUT datasets are datasets with SEQUENTIAL, INDEXED, or RELATIVE organization, SEQUENTIAL, RANDOM, or DYNAMIC access mode, and OUTPUT or EXTEND open mode.
  INPUT datasets are datasets with INDEXED, RELATIVE, or SEQUENTIAL organization, SEQUENTIAL access mode, and INPUT open mode.
  LOOKUP datasets are datasets with INDEXED or RELATIVE organization, RANDOM or DYNAMIC access mode, and INPUT open mode.
  UPDATEABLE LOOKUP datasets are datasets with INDEXED or RELATIVE organization, RANDOM or DYNAMIC access mode, and I-O open mode.

In some examples, an "effective open mode" of a file can be determined by counting the actual Input and Output operations for the file. For example, if a file is opened in I-O mode, but has only WRITE operations and no READ or START operations, the "effective open mode" can be reduced to EXTEND.

Referring to FIG. 5, a table 501 lists the different combinations of dataset organization, access mode, and open mode along with the dataset function associated with each combination.

Referring again to FIG. 4, the output of the dataset function analyzer 442 is a dataset functions result 450 that includes a listing of all datasets accessed by the COBOL program along with their associated function in the COBOL program.

The metadata analyzer 441 analyzes the parse tree to extract metadata and to create reusable data types (e.g. DML data types) and type definition files. The reusable data types are distinct from storage allocation in the COBOL program. The output of the metadata analyzer 441 is a data types result 447.

The SQL analyzer 443 analyzes the parse tree to identify embedded structured query language (SQL) code (or simply "embedded SQL") in the COBOL program. Any identified embedded SQL is processed into Database Interface Information 449. A database application programming interface (API) for accessing a database may provide primitives that can be used within the Database Interface Information 449. In some examples, the inclusion of these primitives avoids the need to access a particular database using a particular schema to compile portions of the embedded SQL into a binary form that is operated on using binary operations. Instead, some of the efficiency that would be provided by such compilation can be traded off for flexibility in being able to interpret the embedded SQL at runtime using the appropriate API primitives placed within the Database Interface Information 449, potentially using a different database and/or schema as needed.

The parse tree for the COBOL program is then provided to the procedure division translator 445 along with the internal components result 448, the dataset functions result 450, the data types result 447, and the Database Interface Information result 449. The procedure division translator 445 analyzes the parse tree to translate the COBOL logic into a "procedural transform" dataflow graph component 452. In general, the procedural transform dataflow graph component 452 is a container type component that contains some or all of the COBOL logic associated with the COBOL program and has input and output ports to accept input data and provide output data from the component, respectively. In cases where the COBOL code includes code from a different programming language (e.g., SQL code is identified by the SQL analyzer 443 and provided in the Database Interface Information result 449) the procedure division translator 445 uses the Database Interface Information result 449 to generate the appropriate representation of that embedded code within the procedural transform dataflow graph component 452. In some examples, the procedure division translator 445 uses a database API to generate the appropriate representation of embedded code. In other examples, embedded SQL Tables and Cursors are replaced with Input Table components, thereby replacing FETCH operations with calls to read_record(port_number) as is done for files.

In some examples, the procedure division translator 445 only generates a file including Data Manipulation Language (DML) code which represents the procedural logic of the COBOL program. The sub-graph synthesizer 446 generates the procedural transform dataflow component that uses the file generated by the procedure division translator 445.

It is noted that FIG. 4 and the above description relate to one possible order of operation of the internal component analyzer 444, the dataset function analyzer 442, the metadata analyzer 441, and the SQL analyzer 443. However, the order of operation of the analyzers is not limited to the order described above and other orders of operation of the analyzers are possible.

Figure 6:
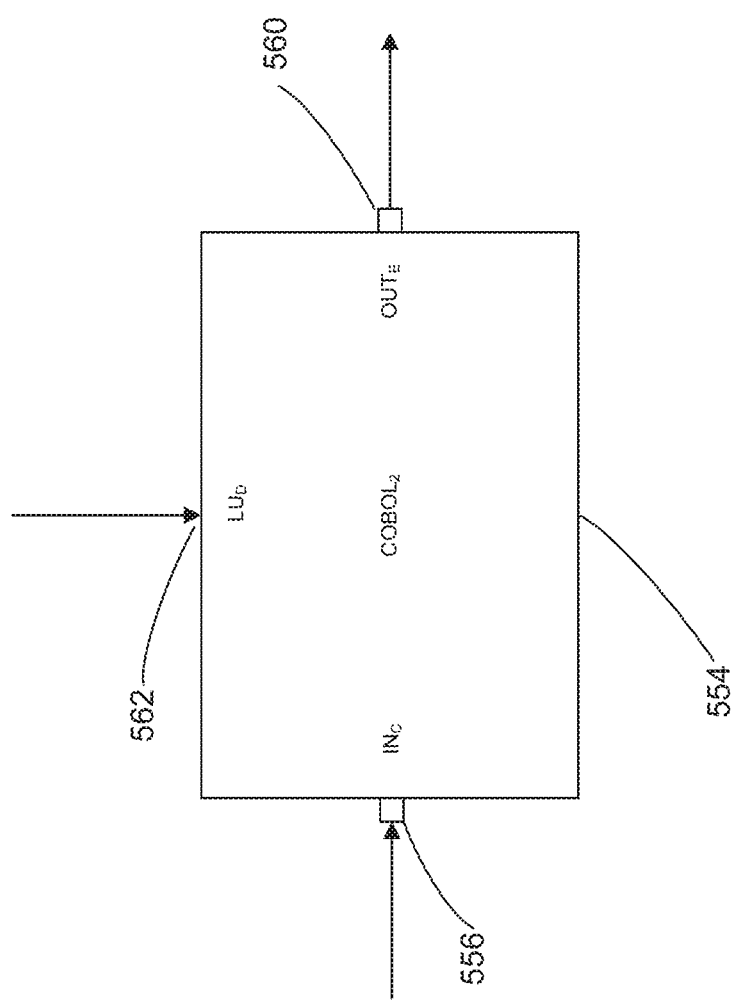
FIG. 6 is a first procedural transform.

Referring to FIG. 6, one simple example of a procedural transform component 554 titled "COBOL2" (i.e., the result of translating the COBOL program executed at step 5 of the JCL script 226 of FIG. 2) has an input port 556 labeled "in0", an output port 560 labeled "out0", and a lookup port 562 labeled "lu0". It is noted that lookup datasets are not necessarily accessed via a port on the component but may instead be accessed using a lookup dataset API. However, for simplification of the description, lookup datasets are described as being accessed via a lookup port.

Each of the ports is configured to be connected to their respective datasets (as identified by the JCL script 226) through a flow. In some examples, the developer can view and edit the DML translation of the COBOL code underlying the procedural transform component 554 by, for example, shift double clicking on the component or hovering over the component until an information bubble appears and clicking on a 'transform' link in the information bubble.

Figure 7:
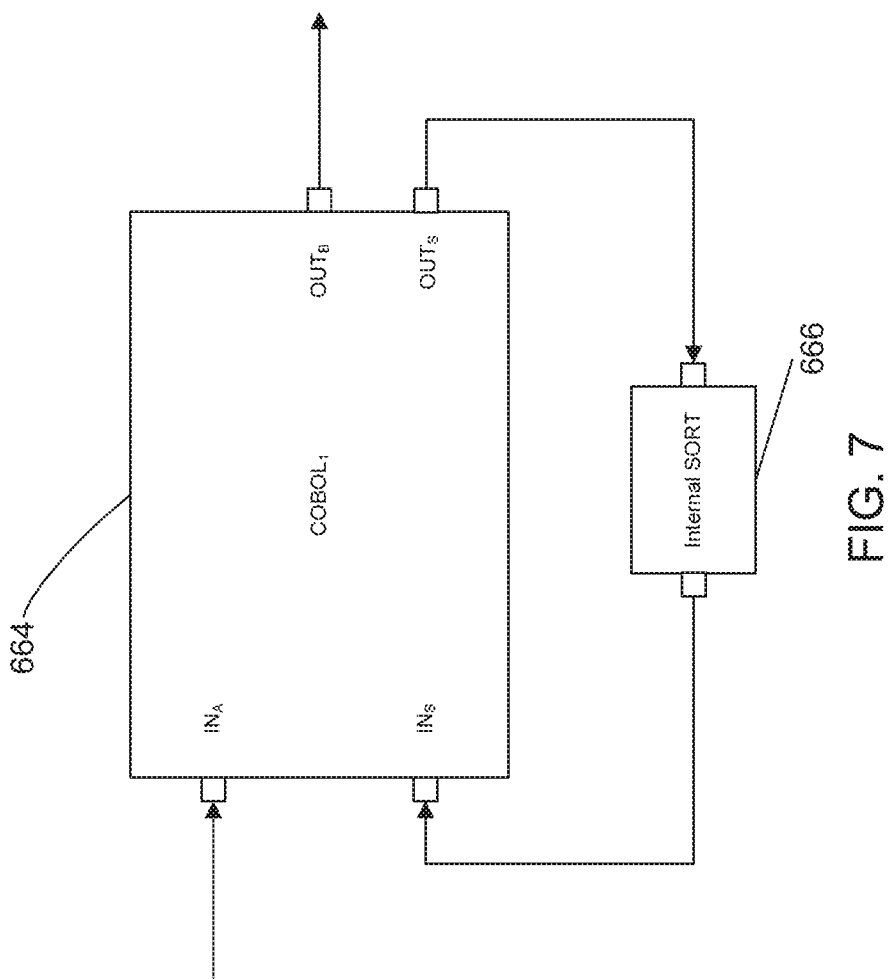
FIG. 7 is a second procedural transform.

Referring to FIG. 7, another example of a procedural transform component 664 illustrates a situation where a COBOL program titled "COBOL1" (i.e., the COBOL program executed at step 3 of the JCL script 226 of FIG. 2) includes a sort command in its code. In this situation, the internal component analyzer 448 identifies the sort command and passes information related to the sort command to the procedure division translator 445. The procedure division translator 445 uses the information from the internal component analyzer 448 to replace the sort command in the code associated with the procedural transform 664 with an interface to a specialized internal sort sub-graph. The sub-graph synthesizer 446 uses the sort information created by 448, and creates an output port, out1, from the procedural transform 664 for providing the data to be sorted to the internal sort dataflow sub-graph component 666 and an input, in1, for receiving the sorted data from the internal sort dataflow sub-graph component 666.

Figure 8:
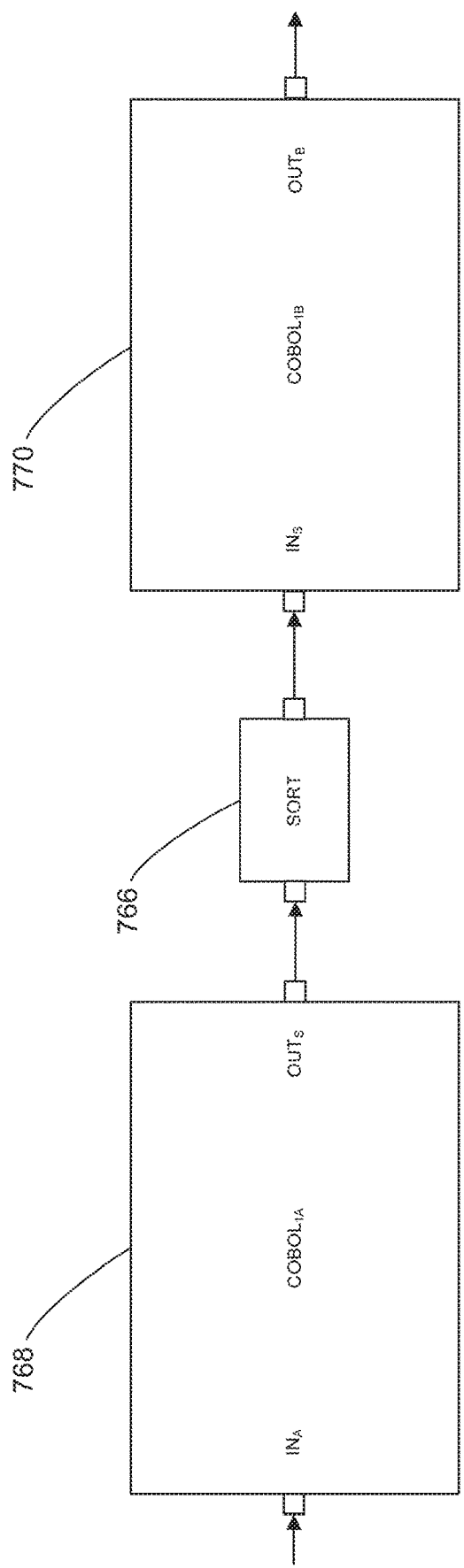
FIG. 8 is a third procedural transform.

Referring to FIG. 8, another similar example of a procedural transform including a sort command is illustrated. In this example, rather than creating a single procedural transform having an output for providing data to be sorted and an input for receiving the sorted data, two procedural transforms are created. A first procedural transform 768 of the two procedural transforms has an output for providing the data to be sorted and a second procedural transform 770 of the two procedural transforms has an input for receiving the sorted data. As is illustrated, in some examples a sort dataflow component 766 can be automatically connected between the two procedural transforms 768, 770 by the sub-graph synthesizer 446. In other examples, a sort dataflow component 766 can be manually connected between the two procedural transforms 768, 770.

2.2 Sub-Graph Synthesizer

Figure 9:
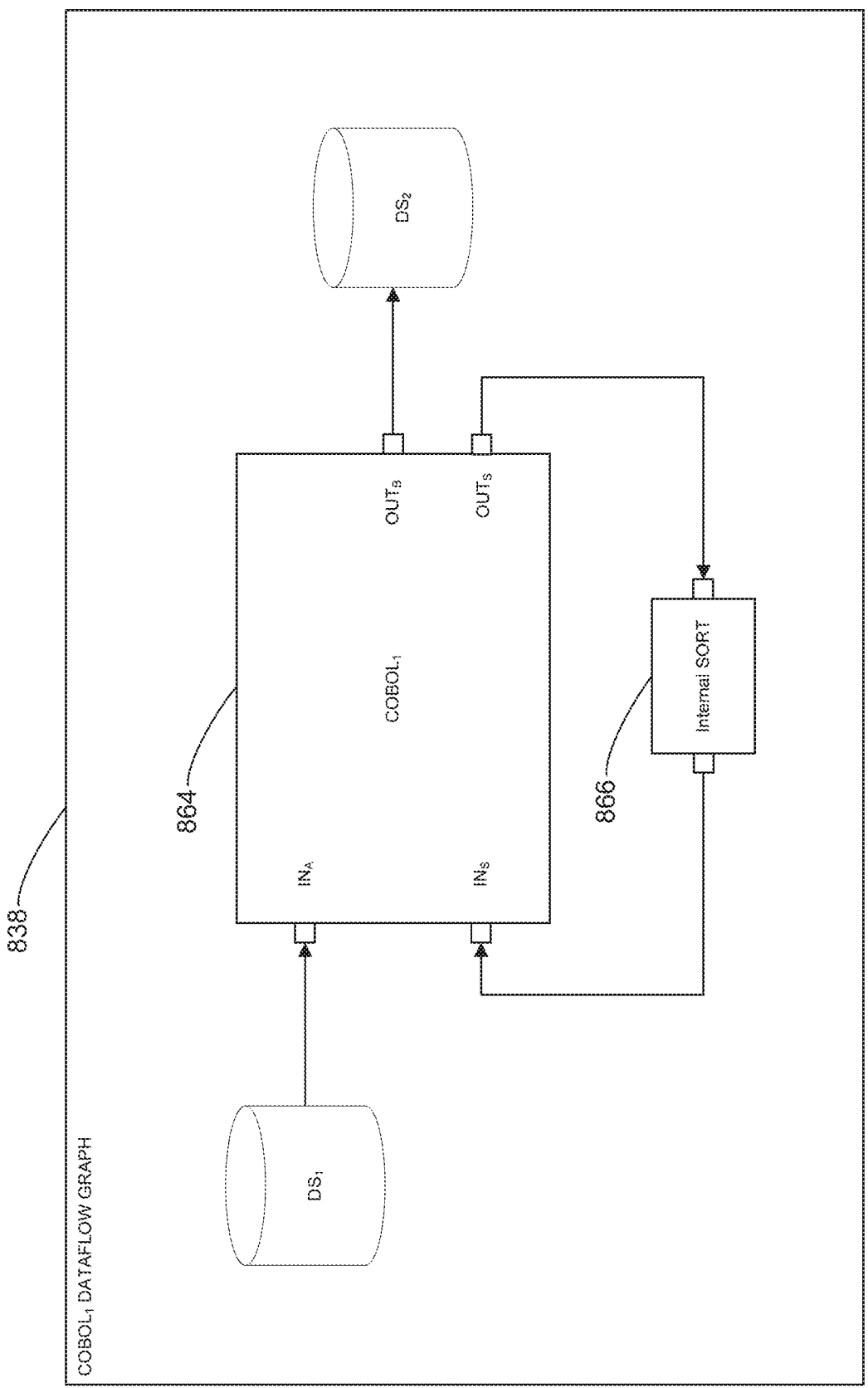
FIG. 9 is a dataflow graph representation of a program.

Referring again to FIG. 4, the procedural transform 452 for the COBOL program is passed to the sub-graph synthesizer 446 along with the internal components result 448 the dataset functions result 450, the data types result 447, and the Database Interface Information result 449. The sub-graph synthesizer 446 uses the inputs to generate a dataflow graph representation 338 for the COBOL program 228. Very generally, for each COBOL program 228, the sub-graph synthesizer 446 creates a dataflow graph including the procedural transform for the COBOL program 228, the datasets associated with the COBOL program 228, and any internal components identified by the internal components analyzer 444. The sub-graph synthesizer 446 then uses the internal components result 448 and the dataset functions result 450 to appropriately connect flows between the datasets, the internal components, and the procedural transform 452. The sub-graph synthesizer 446 uses the data types result 447 to describe the data flowing through component ports. Referring to FIG. 9, one example of a dataflow graph representation 838 for the exemplary COBOL program titled COBOL1 includes a procedural transform 864 having an input port labeled in0 connected by a flow to an input file with the file handle "A" associated with dataset DS1.data, an output port labeled out0 connected by a flow to an output file with the file handle "B" associated with dataset DS2.data, and output and input ports, out1 and in1 connected by flows to an internal sort component 866.

2.3 Composite Graph Synthesizer

Referring back to FIG. 3, the dataflow graph representations 338 of the COBOL programs are then passed to the composite graph synthesizer 336 along with the JCL script 226. By analyzing the order of execution of the COBOL programs in the JCL script 226 along with the functions of the datasets associated with the COBOL programs, the composite graph synthesizer 336 connects the dataflow graph representations of the COBOL code into a single composite dataflow graph 332.

Figure 10:
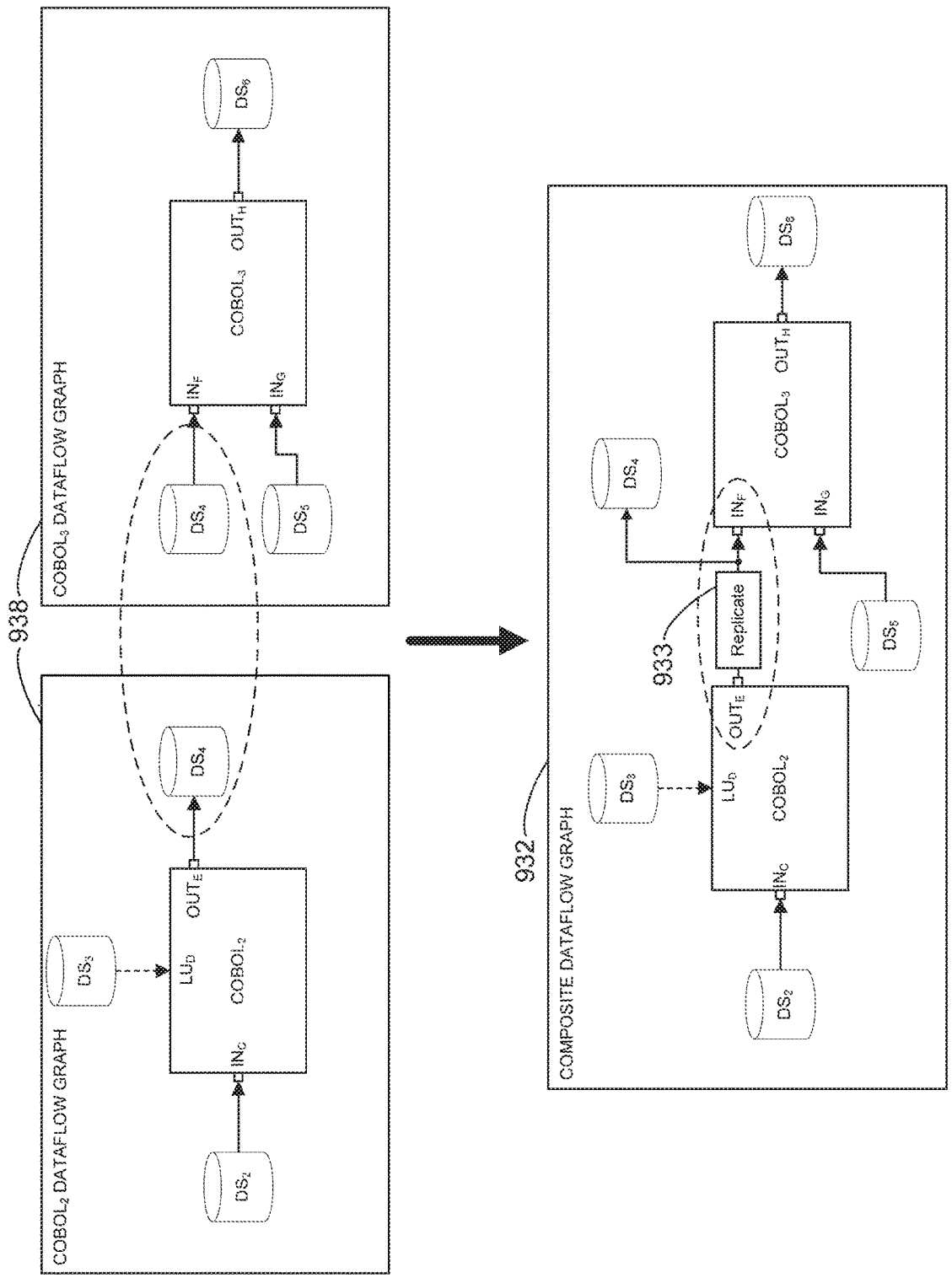
FIG. 10 illustrates the creation of a composite dataflow graph.

For example, referring to FIG. 10, a dataflow graph representation of the COBOL program titled COBOL2 reads from an input file "C" associated with dataset DS2.data at an input port labeled in0, enriches the data by accessing a lookup file "D" associated with DS3.data at a lookup port lu0, and writes to an output file "E" associated with dataset DS4.data at an output port labeled out0. A dataflow graph representation of the COBOL program titled COBOL3 reads from two input datasets: "F" associated with DS4.data at an input port labeled in0 and "G" associated with DS5.data at an input port labeled in1 and writes to an output dataset "H" associated with DS6.data at an output port labeled out0. The composite graph synthesizer 336 merges the JCL script 226 information with the information derived by the translation of the COBOL programs to determine that COBOL2 is executed before COBOL3, and that DS4.data is output by COBOL2 and input by COBOL3, so that the output port labeled out0 of COBOL2 can be connected by a flow to the input port labeled in0 of COBOL3, thereby eliminating the need for COBOL3 to read dataset DS4.data from disk. FIG. 10 illustrates an exemplary composite dataflow graph 932 with a flow connecting the output port of COBOL2 labeled out0 and the input port of COBOL3 labeled in0 through a replicate component 933. The replicate component 933 writes data into DS4.data on disk but also passes the data directly to the input port of COBOL3 labeled in0 via a flow. In this way, COBOL3 can read data flowing from COBOL2 without having to wait for the dataset DS4.data to be written to disk, and the data stored in DS4.data, which is not deleted by the JCL script 226 is available to other processes.

In some examples, if a JCL procedure does not delete an intermediate dataset (e.g., file) after it is created, it is possible that the dataset is used by some other process running in the execution environment. In examples where this is the case, the intermediate dataset is preserved in the dataflow graph representation of the JCL procedure (e.g., by using a replicate component as is described above). In some examples, if the JCL procedure does delete the intermediate dataset after it is created, the intermediate dataset is completely eliminated in the dataflow graph representation of the JCL procedure, and no Replicate component is needed for it.

In some examples, the metadata of ports that are connected by a flow, as described above for the COBOL2 and COBOL3 dataflow graphs, might not be identical, because the first software specifications used alternate definitions for the same dataset. The Composite Graph Synthesizer 336 can then insert a Redefine Format component on the connecting flow. The presence of such Redefine Format components can later be used to consolidate dataset metadata. Metadata information is derived by the Metadata Analyzer 441 for each Dataflow Graph 338.

3 Exemplary Operation

Figure 11:
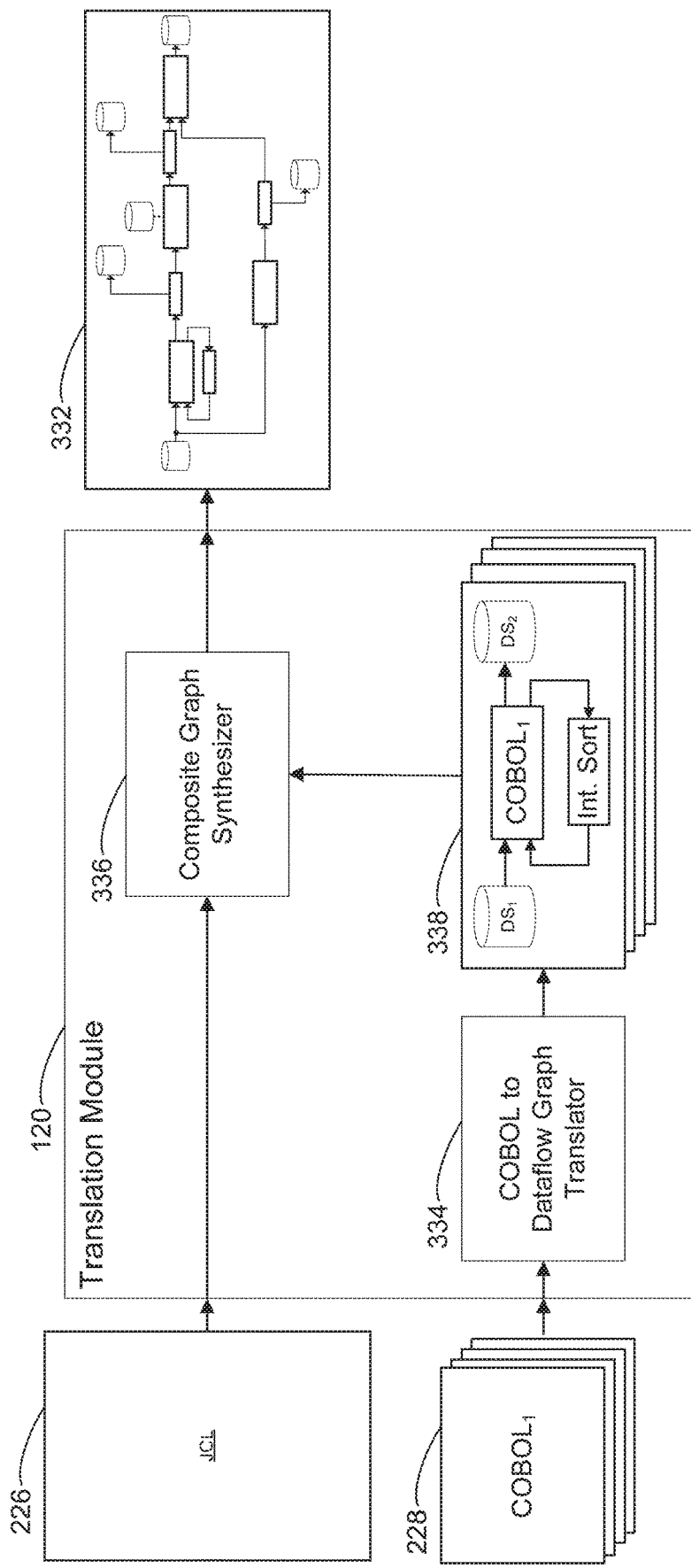
FIG. 11 is an operational example of the top-level software translation module of FIG. 3.

Referring to FIG. 11, a simple operational example of the translation module 120 receives the JCL script 226 and the four COBOL programs 228 of FIG. 2 as input and processes the inputs to generate a composite dataflow graph 332.

In a first stage of the translation process, the COBOL programs 228 are provided to the COBOL to Dataflow Graph Translator 334, which processes each of the COBOL programs to generate a dataflow graph representation 338a-d of the COBOL program. In the second stage, the JCL script 226 and the dataflow graph representations 338a-d of the COBOL programs are provided to the composite graph synthesizer 336, which processes the JCL script 226 and the dataflow graph representations 338a-d of the COBOL programs to generate the composite dataflow graph 332.

Figure 12:
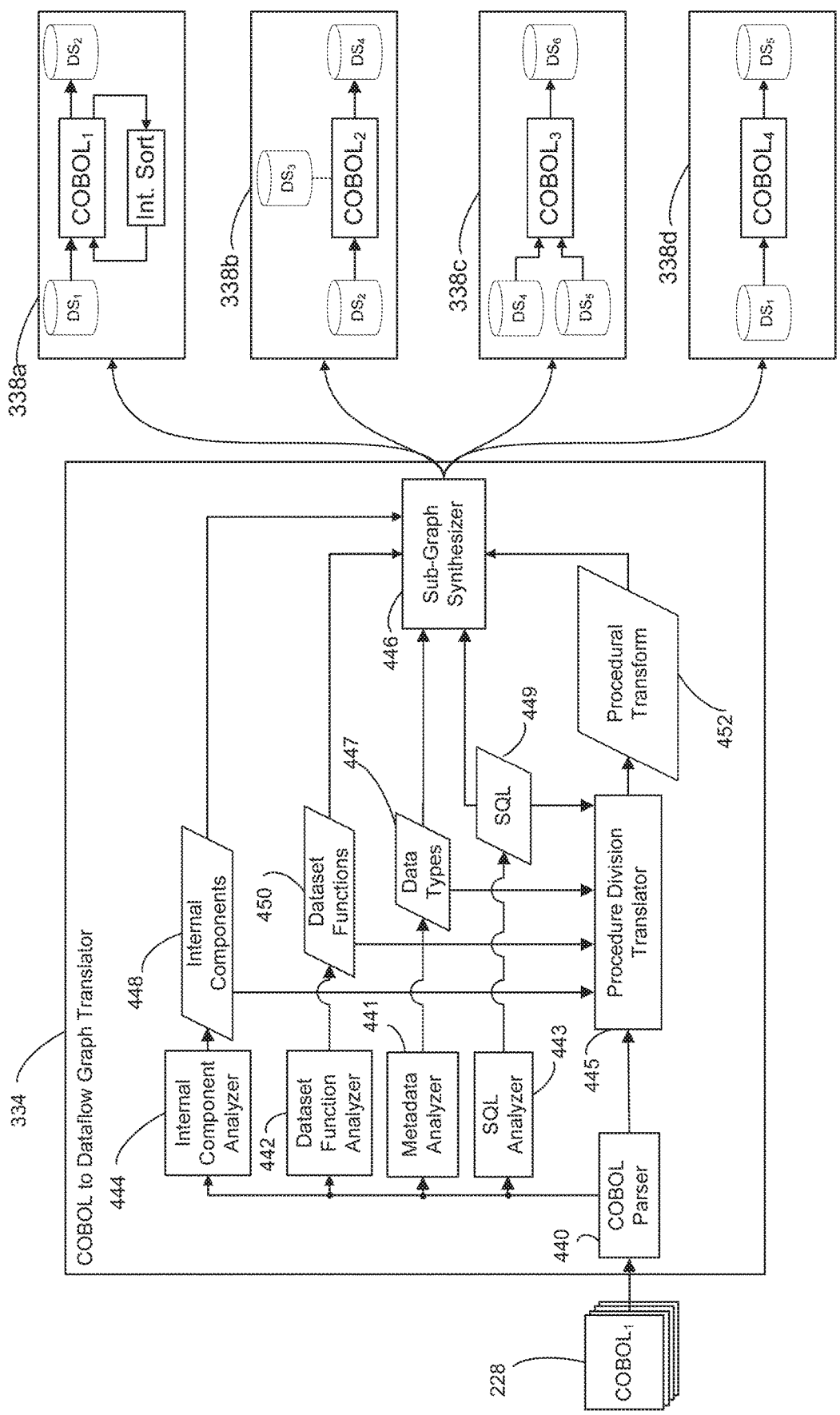
FIG. 12 is an operational example of the software translation module of FIG. 4.

Referring to FIG. 12, the COBOL to dataflow graph translator 334 processes each of the COBOL programs 228 using the COBOL parser 440, the internal component analyzer 444, the dataset function analyzer 442, the metadata analyzer 441, and the SQL analyzer 443. The outputs generated by the COBOL parser 440, the internal component analyzer 444, the dataset function analyzer 442, the metadata analyzer 441, and the SQL analyzer 443 are provided to the procedure division translator 445, and together with its output to the sub-graph synthesizer 446, which generates the dataflow graph representations 338a-d for each of the COBOL programs.

For the COBOL1 program executed at step 3 of the JCL script 226, the internal component analyzer 444 identified that the program includes an internal sort component. The dataset function analyzer 442 identified that the COBOL1 program accesses one input dataset, "A" and one output dataset, "B". The identified internal sort component, the datasets, and their relationships to the procedural transform for the COBOL1 program are reflected in the dataflow graph representation 338a of the COBOL1 program.

For the COBOL2 program executed at step 5 of the JCL script 226, the internal component analyzer 444 did not identify any internal components and the SQL analyzer 443 did not identify any embedded SQL code. The dataset function analyzer 442 identified that the COBOL2 program accesses one dataset, "C" as an input dataset, another dataset, "E" as an output dataset, and another dataset, "D" as a lookup dataset. The identified datasets and their relationships to the procedural transform for the COBOL2 program are reflected in the dataflow graph representation 338b of the COBOL2 program.

For the COBOL3 program executed at step 6 of the JCL script 226, the internal component analyzer 444 did not identify any internal components and the SQL analyzer 443 did not identify any embedded SQL code. The dataset function analyzer 442 identified that the COBOL3 program accesses two datasets, "F" and "G" as input datasets and one dataset, and "H" as an output dataset. The identified datasets and their relationships to the procedural transform for the COBOL3 program are reflected in the dataflow graph representation 338c of the COBOL3 program.

For the COBOL4 program executed at step 10 of the JCL script 226, the internal component analyzer 444 did not identify any internal components and the SQL analyzer 443 did not identify any embedded SQL code. The dataset function analyzer 442 identified that the COBOL4 program accesses one dataset, "I" as an input dataset and another dataset, "J" as an output dataset. The identified datasets and their relationships to the procedural transform for the COBOL4 program are reflected in the dataflow graph representation 338d of the COBOL4 program.

Figure 13:
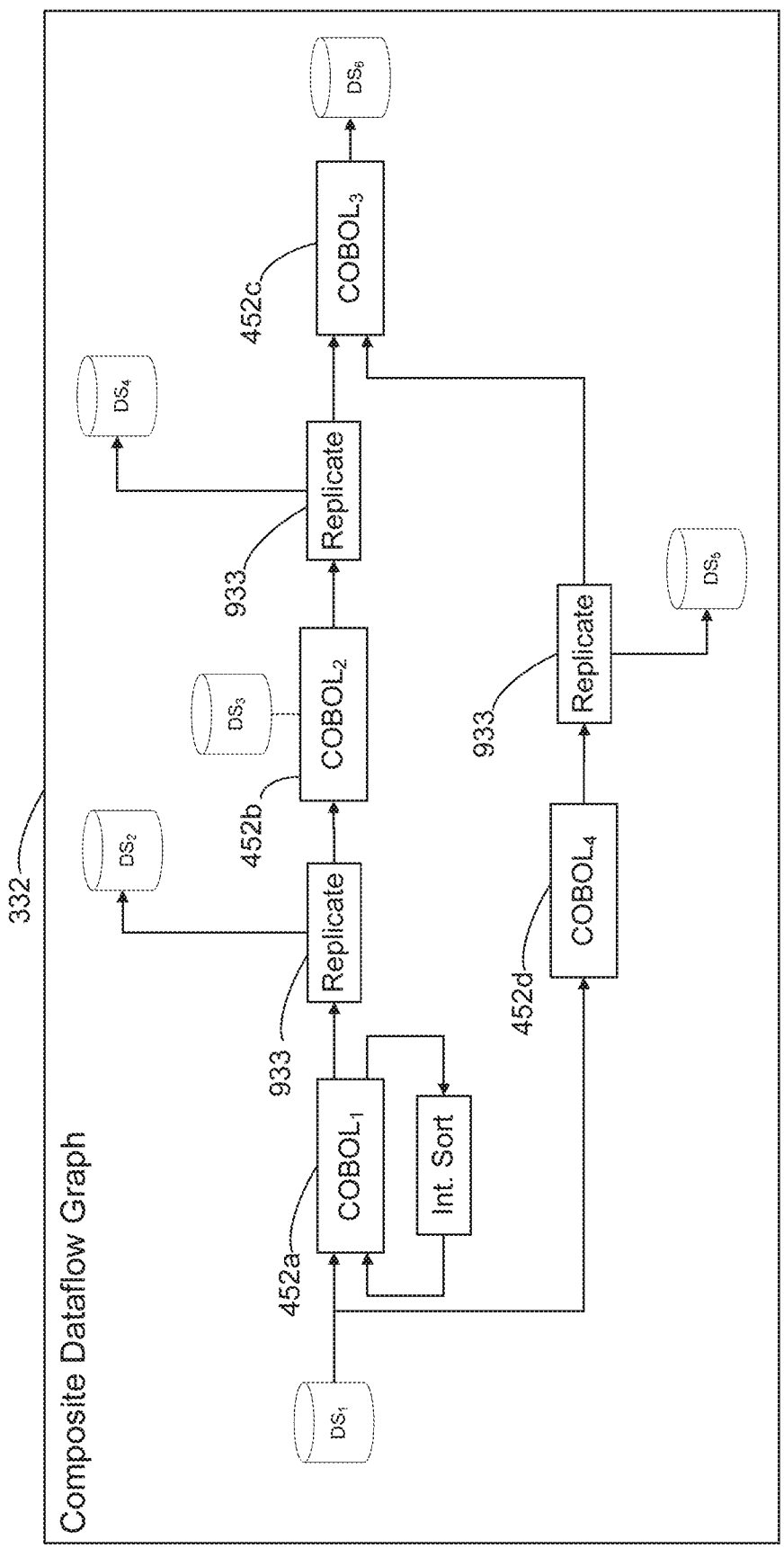
FIG. 13 is a composite dataflow graph.

Referring again to FIG. 11, the JCL script 226 and the dataflow graph representations 338a-d of the four COBOL programs are provided to the composite graph synthesizer 336 which analyzes the JCL script 226 and the dataflow graph representations 338a-d to connect the dataflow graph representations 338a-d into the single composite graph 332. Referring to FIG. 13, the composite graph for the JCL script 226 and the four COBOL programs 228 of FIG. 2 includes four procedural transforms COBOL1 452a, COBOL2 452b, COBOL3 452c, and COBOL4 452d interconnected by flows. Replicate components 933 are used to set aside (i.e., write as output datasets) a number of intermediate datasets (i.e., DS2.data, DS4.data, and DS5.data) in the composite dataflow graph 332, directly connecting the components using flows.

4 Alternatives

While the above description describes only a limited number of operations and elements of a program written in a procedural programming language being translated into dataflow graph components, in some examples, all of the source code of the original programs (e.g., the COBOL programs) is translated into a dataflow graph representation.

The above-described system can be used to translate a software specification including any combination of one or more procedural programming languages into a dataflow graph representation of the software specification.

In some examples, the above-described translation module may encounter translation tasks that it is unprepared to process. In such examples, the translation module outputs a list of incomplete translation tasks that the developer is able to read and use to manually repair the translation.

While the above description describes certain modules of the COBOL to dataflow graph translator 334 as running in parallel, this is not necessarily the case. In some examples, the metadata analyzer 441 first receives the parse tree from the COBOL parser 440. The metadata analyzer 441 enriches and/or simplifies the parse tree and provides it to the dataset function analyzer 442. The dataset function analyzer 442 enriches and/or simplifies the parse tree and provides it to the SQL analyzer 443. The SQL analyzer 443 enriches and/or simplifies the parse tree and provides it to the internal component analyzer 444. The internal component analyzer 444 enriches and/or simplifies the parse tree and provides it to the procedure division translator 445. That is the components operate on the parse tree serially.

5 Implementations

The source code translation approach described above can be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for software specification translation, the method including:
   receiving a first software specification specified in a first programming language;
   receiving a second software specification specified in a second programming language;
   receiving a third software specification specified in a third programming language different from the first and second programming languages, the third software specification defining one or more data relationships between the first software specification and the second software specification, wherein the first, second, and third software specification together define a first data processing activity that includes at least one of (a) storing data in intermediate storage on non-transitory media, and (b) performing a sequence of steps expressed in the first, second, and third programming languages, wherein the first data processing activity represents a transformation of input data comprising a plurality of data records to output data;
   forming a representation of the first software specification in a fourth programming language different from the first, second, and third programming languages, the fourth programming language being a dataflow graph programming language;
   forming a representation of the second software specification in the fourth programming language;
   analyzing the third software specification to identify the one or more data relationships; and
   forming a combined representation of the first software specification and the second software specification in the fourth dataflow graph programming language, including forming connections in the fourth dataflow graph programming language between the representation of the first software specification in the fourth dataflow graph programming language and the representation of the second software specification in the fourth dataflow graph programming language according to the identified one or more data relationships, wherein the combined representation defines a second data processing activity representing an equivalent transformation of the input data to the output data, and including at least one type or parallelism from a group consisting of component, data, and pipeline parallelism, the at least one type of parallelism not defined in the first data processing activity.

2. A method comprising:
   receiving, at one or more processors, a group of software specifications comprising a plurality of software specifications specified in one or more text-based programming languages, the group of software specifications together defining a first data processing activity that includes at least one of (a) storing data in intermediate storage on non-transitory media, and (b) performing a sequence of steps expressed in the one or more text-based programming languages, wherein the first data processing activity represents a transformation of input data comprising a plurality of data records to output data;
   processing the group of software specifications, by the one or more processors, including processing each of two or more of the plurality of software specifications specified in the one or more text-based processing languages to form respective dataflow graph representations in a dataflow graph programming language different than any of the one or more text-based programming languages, the processing of the group of software specifications including identifying one or more data relationships based on a control software specification, from the plurality of software specification, to control execution of the plurality of software specifications; and
   combining, by the one or more processors, based on the identified data relationships the dataflow graph representations to form a composite dataflow graph in the dataflow graph programming language;
   wherein the composite dataflow graph defines a second data processing activity representing an equivalent transformation of the input data to the output data, and including at least one type or parallelism from a group consisting of component, data, and pipeline parallelism, the at least one type of parallelism not defined in the first data processing activity.

3. The method of claim 2, further comprising:
executing the composite dataflow graph on a parallel computing environment, including causing the at least one of component, data, and pipeline parallelism during execution.

4. The method of claim 3, wherein causing said parallelism includes concurrent execution of data operations defined in different ones of the plurality of software specifications in the parallel computing environment.

5. The method of claim 3, wherein causing said parallelism includes concurrent execution of the sequence of steps arising from different data segments of the input data on different parallel computing elements of the parallel computing environment.

6. The method of claim 3, wherein causing said parallelism includes streaming data that is defined in the first data processing activity as being written to and read from the intermediate storage, the streaming being between parallel computing elements of the parallel computing environment without writing to or reading from the intermediate storage.

7. The method of claim 2, wherein the sequence of steps expressed in the one or more text-based programming languages includes statements defining sequential execution of at least some of the steps, and wherein the composite dataflow graph defines resultant statements, corresponding to the statements defining the sequential execution of the at least some of the steps of the first data processing activity, to permit parallel execution, in the second data processing activity, of the at least some of the steps corresponding to the statements defining the sequential execution in the first data processing activity.

8. The method of claim 2, wherein the intermediate storage comprises a file for storage on a non-transitory file system.

9. The method of claim 2, wherein the transformation of the input data to the output data comprises a transformation of a first set of dataset to a second set of datasets, each dataset comprising a respective plurality of data records.

10. The method of claim 2, wherein processing the each of the two or more of the plurality of software specifications comprises processing a software specification, from the group of software specifications, specified in a text-based programming language, including parsing programming language statements in said programming language, and generating corresponding parts of the dataflow graph representation of that code unit.

11. The method of claim 10, wherein processing the software specification specified in a text-based programming language comprises identifying statements representing access to the intermediate storage, and representing said access in the dataflow graph representation of that code unit.

12. The method of claim 2, wherein at least some of the plurality of software specifications specified in one of the one or more text-based programming languages define a plurality of sequential steps.

13. The method of claim 2, wherein the one or more text-based programming languages comprise one or more of C, C++, Java, C#, a Job Control Language (JCL), COBOL, and Fortran.

14. The method of claim 2, wherein the dataflow graph programming language comprises a text-based representation of a plurality of nodes of a dataflow graph, at least some of said text-based representations corresponding to procedural logic defined in a software specification specified in one of one or more text-based programming languages.

15. The method of claim 2, wherein at least one of the plurality of software specifications specified in the one or more text-based programming languages includes embedded code that is specified in at least one language that is different from the one or more text-based programming languages, and wherein the respective representations of the at least one of the plurality of software specifications in the dataflow graph representation includes a representation of the embedded code identified in the at least one of the code units.

16. The method of claim 15, further comprising: analyzing the at least one of the code units to identify the embedded code.

17. The method of claim 15, wherein the embedded code is specified in a query language, and wherein the representation of the embedded code includes one or more primitives of a database application programming interface.

18. The method of claim 2 wherein a first software specification of the plurality of software specifications is configured to interact with one or more datasets, each dataset having an associated dataset type of a plurality of dataset types in the first software specification, the method further comprises processing the first software specification, including:
identifying the one or more datasets of the first software specification, and for each of the identified one or more datasets, determining the associated type of the dataset in the first software specification; and
forming a representation of the first software specification in the dataflow graph representation, including, for each of the identified one or more datasets, forming a specification of the dataset in the dataflow graph representation, the specification of the dataset in the dataflow graph representation having a type corresponding to the associated type of the dataset in a corresponding one of the one or more text-based processing languages associated with the first software specification.

19. A computing system for code translation, including:
an input device or port configured to receive a group of software specifications comprising a plurality of software specifications specified in one or more text-based programming languages, the group of software specifications together defining a first data processing activity that includes at least one of (a) storing data in intermediate storage on non-transitory media, and (b) performing a sequence of steps expressed in the one or more text-based programming languages, wherein the first data processing activity represents a transformation of input data comprising a plurality of data records to output data; and
at least one processor configured to:
process the group of software specifications, including processing each of two or more of the plurality of software specifications specified in the one or more text-based processing languages to form respective dataflow graph representations in a dataflow graph programming language different than any of the one or more text-based programming languages, the processing of the group of software specifications including identifying one or more data relationships based on a control software specification, from the plurality of software specification, to control execution of the plurality of software specifications; and
combine based on the identified data relationships the dataflow graph representations to form a composite dataflow graph in the dataflow graph programming language;
wherein the composite dataflow graph defines a second data processing activity representing an equivalent transformation of the input data to the output data, and including at least one type or parallelism from a group consisting of component, data, and pipeline parallelism, the at least one type of parallelism not defined in the first data processing activity.

20. The computing system of claim 19, wherein the at least one processor is further configured to:
   execute the composite dataflow graph on a parallel computing environment, including to cause the at least one of component, data, and pipeline parallelism during execution.

21. The computing system of claim 20, wherein the at least one processor configured to cause said parallelism is configured to perform one or more of:
   cause concurrent execution of data operations defined in different ones of the plurality of software specifications in the parallel computing environment;
   cause concurrent execution of the sequence of steps arising from different data segments of the input data on different parallel computing elements of the parallel computing environment; or
   stream data that is defined in the first data processing activity as being written to and read from the intermediate storage, the streaming of data being between parallel computing elements of the parallel computing environment without writing to or reading from the intermediate storage.

22. The computing system of claim 19, wherein the sequence of steps expressed in the one or more text-based programming languages includes statements defining sequential execution of at least some of the steps, and wherein the composite dataflow graph defines resultant statements, corresponding to the statements defining the sequential execution of the at least some of the steps of the first data processing activity, to permit parallel execution, in the second data processing activity, of the at least some of the steps corresponding to the statements defining the sequential execution in the first data processing activity.

23. The computing system of claim 19, wherein the at least one processor configured to process the each of the two or more of the plurality of software specifications is configured to process a code unit, from the group of software specifications, specified in a text-based programming language, including to parse programming language statements in said programming language, and to generate corresponding parts of the dataflow graph representation of that code unit.

24. The computing system of claim 19, wherein at least one of the plurality of software specifications specified in the one or more text-based programming languages includes embedded code that is specified in at least one language that is different from the one or more text-based programming languages, and wherein the respective representations of the at least one of the plurality of software specifications in the dataflow graph representation includes a representation of the embedded code identified in the at least one of the plurality of software specifications.

25. The computing system of claim 19, wherein a first software specification of the plurality of software specifications is configured to interact with one or more datasets, each dataset having an associated dataset type of a plurality of dataset types in the first code unit, wherein the at least one processor is configured to process the first code unit, including to:
   identify the one or more datasets of the first code unit, and for each of the identified one or more datasets, to determine the associated type of the dataset in the first code unit; and
   form a representation of the first software specification in the dataflow graph representation, including, for each of the identified one or more datasets, forming a specification of the dataset in the dataflow graph representation, the specification of the dataset in the dataflow graph representation having a type corresponding to the associated type of the dataset in a corresponding one of the one or more text-based processing languages associated with the first code unit.

26. A computing system for code translation, including:
   means for receiving a group of software specifications comprising a plurality of software specifications specified in one or more text-based programming languages, the group of software specifications together defining a first data processing activity that includes at least one of (a) storing data in intermediate storage on non-transitory media, and (b) performing a sequence of steps expressed in the one or more text-based programming languages, wherein the first data processing activity represents a transformation of input data comprising a plurality of data records to output data;
   means for processing the group of software specifications, including processing each of two or more of the plurality of software specifications specified in the one or more text-based processing languages to form respective dataflow graph representations in a dataflow graph programming language different than any of the one or more text-based programming languages, the processing of the group of software specifications including identifying one or more data relationships based on a control software specification, from the plurality of software specification, to control execution of the plurality of software specifications; and
   means for combining based on the identified data relationships the dataflow graph representations to form a composite dataflow graph in the dataflow graph programming language;
   wherein the composite dataflow graph defines a second data processing activity representing an equivalent transformation of the input data to the output data, and including at least one type or parallelism from a group consisting of component, data, and pipeline parallelism, the at least one type of parallelism not defined in the first data processing activity.

27. The computing system of claim 26, further comprising:
   means for executing the composite dataflow graph on a parallel computing environment, including means for causing the at least one of component, data, and pipeline parallelism during execution.

28. The computing system of claim 27, wherein the means for causing said parallelism includes means for one or more of:
   concurrent execution of data operations defined in different ones of the plurality of software specifications in the parallel computing environment;
   concurrent execution of the sequence of steps arising from different data segments of the input data on different parallel computing elements of the parallel computing environment; or
   streaming data that is defined in the first data processing activity as being written to and read from the intermediate storage, the streaming being between parallel computing elements of the parallel computing environment without writing to or reading from the intermediate storage.

29. The computing system of claim 26, wherein the sequence of steps expressed in the one or more text-based programming languages includes statements defining sequential execution of at least some of the steps, and wherein the composite dataflow graph defines resultant statements, corresponding to the statements defining the sequential execution of the at least some of the steps of the first data processing activity, to permit parallel execution, in the second data processing activity, of the at least some of the steps corresponding to the statements defining the sequential execution in the first data processing activity.

30. The computing system of claim 26, wherein the means for processing the each of the two or more of the plurality of software specifications comprises means for processing a code unit, from the group of software specifications, specified in a text-based programming language, including parsing programming language statements in said programming language, and generating corresponding parts of the dataflow graph representation of that code unit.

31. The computing system of claim 26, wherein at least one of the plurality of software specifications specified in the one or more text-based programming languages includes embedded code that is specified in at least one language that is different from the one or more text-based programming languages, and wherein the respective representations of the at least one of the plurality of software specifications in the dataflow graph representation includes a representation of the embedded code identified in the at least one of the plurality of software specifications.

32. The computing system of claim 26, wherein a first software specification of the plurality of software specifications is configured to interact with one or more datasets, each dataset having an associated dataset type of a plurality of dataset types in the first code unit, wherein the means for processing include means for processing the first code unit, including to:
   identify the one or more datasets of the first code unit, and for each of the identified one or more datasets, determining the associated type of the dataset in the first code unit; and
   form a representation of the first software specification in the dataflow graph representation, including, for each of the identified one or more datasets, forming a specification of the dataset in the dataflow graph representation, the specification of the dataset in the dataflow graph representation having a type corresponding to the associated type of the dataset in a corresponding one of the one or more text-based processing languages associated with the first code unit.

33. A non-transitory computer-readable medium, for code translation, storing statements and instructions for use, in the execution in a computer, of a method comprising the steps of:
   receiving a group of software specifications comprising a plurality of software specifications specified in one or more text-based programming languages, the group of software specifications together defining a first data processing activity that includes at least one of (a) storing data in intermediate storage on non-transitory media, and (b) performing a sequence of steps expressed in the one or more text-based programming languages, wherein the first data processing activity represents a transformation of input data comprising a plurality of data records to output data;
   processing the group of software specifications, including processing each of two or more of the plurality of software specifications specified in the one or more text-based processing languages to form respective dataflow graph representations in a dataflow graph programming language different than any of the one or more text-based programming languages, the processing of the group of software specifications including identifying one or more data relationships based on a control software specification, from the plurality of software specification, to control execution of the plurality of software specifications; and
   combining based on the identified data relationships the dataflow graph representations to form a composite dataflow graph in the dataflow graph programming language;
   wherein the composite dataflow graph defines a second data processing activity representing an equivalent transformation of the input data to the output data, and including at least one type or parallelism from a group consisting of component, data, and pipeline parallelism, the at least one type of parallelism not defined in the first data processing activity.

34. The computer-readable medium of claim 33, wherein the statements and instruction for use of the method that includes the additional step of:
   executing the composite dataflow graph on a parallel computing environment, including causing the at least one of component, data, and pipeline parallelism during execution.

35. The computer-readable medium of claim 34, wherein causing said parallelism includes causing one or more of:
   concurrent execution of data operations defined in different ones of the plurality of software specifications in the parallel computing environment;
   concurrent execution of the sequence of steps arising from different data segments of the input data on different parallel computing elements of the parallel computing environment; or
   streaming data that is defined in the first data processing activity as being written to and read from the intermediate storage, the streaming being between parallel computing elements of the parallel computing environment without writing to or reading from the intermediate storage.

* * * * *